United States Patent
Woo et al.

(10) Patent No.: US 7,286,624 B2
(45) Date of Patent: Oct. 23, 2007

(54) TWO-WAY RF RANGING SYSTEM AND METHOD FOR LOCAL POSITIONING

(75) Inventors: Richard Kai-Tuen Woo, deceased, late of Orange, CA (US); by Andrea Woo, legal representative, Orange, CA (US); by Russell Woo, legal representative, Palo Alto, CA (US); Mark Lindsay Rentz, Torrance, CA (US); Scott Adam Stephens, Phoenix, AZ (US); Mark Phillip Kaplan, Culver City, CA (US)

(73) Assignee: Navcom Technology Inc., Torrance, CA (US)

( * ) Notice: Subject to any disclaimer, the term of this patent is extended or adjusted under 35 U.S.C. 154(b) by 320 days.

(21) Appl. No.: 10/614,098

(22) Filed: Jul. 3, 2003

(65) Prior Publication Data

US 2005/0002481 A1   Jan. 6, 2005

(51) Int. Cl.
*H04L 7/00* (2006.01)
*H04Q 7/20* (2006.01)

(52) U.S. Cl. ............... 375/356; 375/358; 455/456.1
(58) Field of Classification Search ......... 375/354, 375/356, 358; 455/456.1, 456.2
See application file for complete search history.

(56) References Cited

U.S. PATENT DOCUMENTS

| 4,710,020 A | 12/1987 | Maddox et al. |
| 4,829,442 A | 5/1989 | Kadonoff et al. |
| 4,873,449 A | 10/1989 | Paramythioti et al. |
| 5,375,059 A | 12/1994 | Kyrtsos et al. |
| 5,390,125 A | 2/1995 | Sennott et al. |
| 5,438,517 A | 8/1995 | Sennott et al. |
| 5,610,815 A | 3/1997 | Gudat et al. |
| 5,640,323 A | 6/1997 | Kleimenhagen et al. |
| 5,657,226 A | 8/1997 | Shin et al. |
| 5,657,317 A | 8/1997 | Mahany et al. |
| 5,874,918 A | 2/1999 | Czarnecki et al. |

(Continued)

OTHER PUBLICATIONS

H. Edelsbruneer and T.S. Tan, "Quadratic time algorithm for the minmax length triangulation", Proceedings of the 32$^{nd}$ Annual Symposium on Foundations of Computer Science, pp. 414-423, 1991, San Juan, Puerto Rico.

(Continued)

*Primary Examiner*—Kevin Kim
(74) *Attorney, Agent, or Firm*—Morgan, Lewis & Bockius LLP

(57) ABSTRACT

A positioning system includes a plurality of devices configured to exchange RF signals with one another. A first device periodically receives a message from each other device during time slots assigned them. The received message includes information representing a time of arrival at the other device of a respective message transmitted by the first device. A time of arrival of the message from each of the other devices is determined by the first device. The first device periodically transmits messages to the other devices, each transmitted message including information representing the determined time of arrival for at least one of the other devices. A range from the first device to each of a plurality of the other devices is determined as function of the determined time of arrival of the message from the other device and the time of arrival information in the message from the other device.

39 Claims, 15 Drawing Sheets

U.S. PATENT DOCUMENTS

| | | |
|---|---|---|
| 5,933,079 A | 8/1999 | Frink |
| 5,982,164 A | 11/1999 | Czarnecki et al. |
| 5,986,602 A | 11/1999 | Frink |
| 6,011,974 A | 1/2000 | Cedervall et al. |
| 6,072,421 A | 6/2000 | Fukae et al. |
| 6,125,135 A | 9/2000 | Woo et al. |
| 6,278,710 B1 * | 8/2001 | Eidson ................. 370/394 |
| 6,424,264 B1 | 7/2002 | Giraldin et al. |
| 6,427,079 B1 | 7/2002 | Schneider et al. |
| 6,453,168 B1 | 9/2002 | McCrady et al. ........... 455/517 |
| 6,459,966 B2 | 10/2002 | Nakano et al. |
| 6,489,917 B2 | 12/2002 | Geisheimer et al. |
| 6,556,942 B1 | 4/2003 | Smith |
| 6,665,333 B2 * | 12/2003 | McCrady et al. ........... 375/147 |
| 2001/0027360 A1 | 10/2001 | Nakano et al. |
| 2001/0051527 A1 | 12/2001 | Kuwahara et al. |
| 2002/0080735 A1 * | 6/2002 | Heath et al. ................. 370/328 |
| 2002/0097181 A1 | 7/2002 | Chou et al. |
| 2003/0005030 A1 | 1/2003 | Sutton et al. |
| 2003/0007473 A1 | 1/2003 | Strong et al. |

OTHER PUBLICATIONS

F. van Diggelen and A. Brown, "Mathematical Aspects of GPS Raim", IEEE Position Location and Navigation Symposium, pp. 733-738, 1994, Las Vegas, NV, USA.

International Search Report for Int'l Application No. PCT/US2004/19967, mailed Mar. 20, 2006.

* cited by examiner

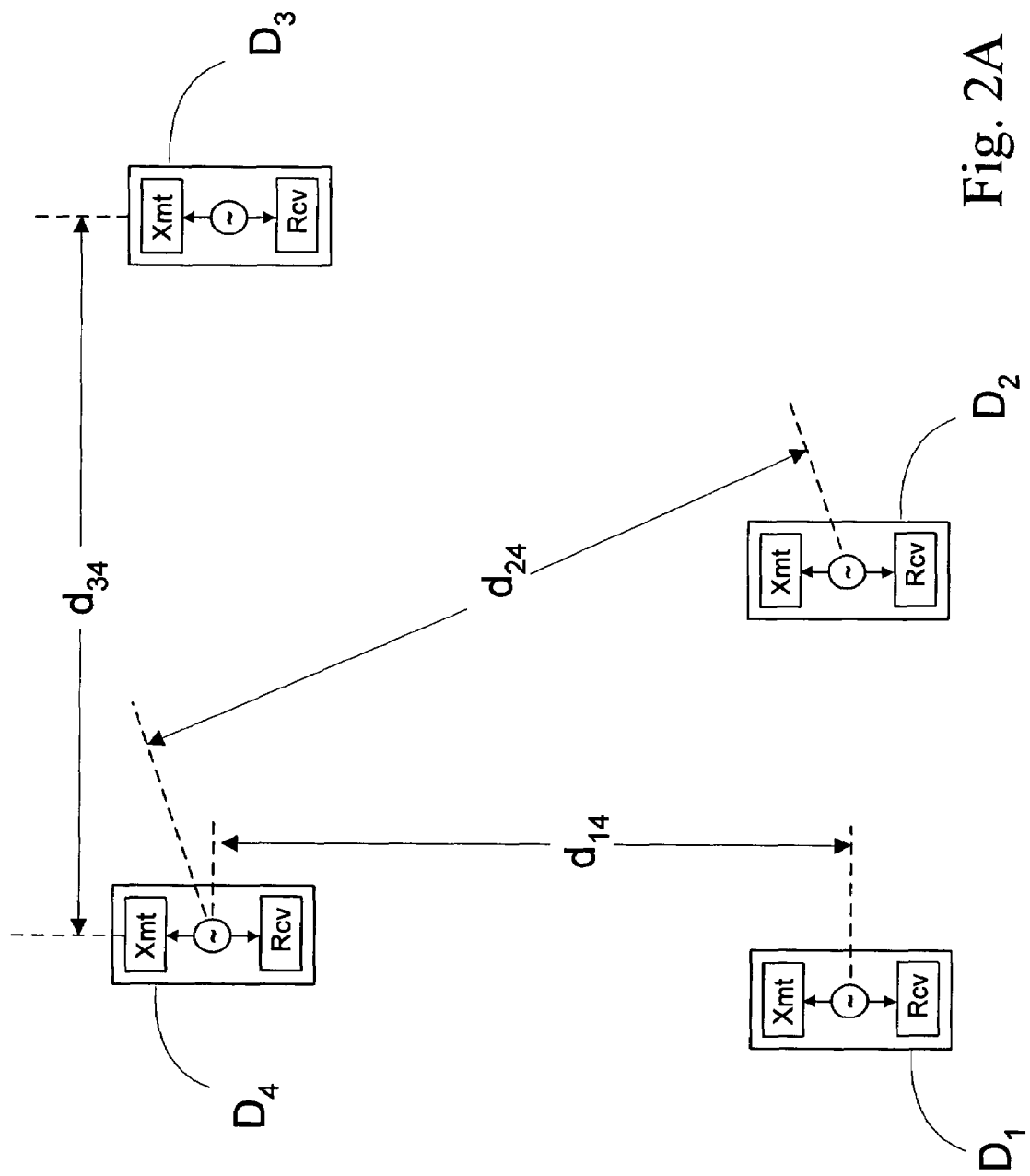

326 Correlate and Angle Rotate Circuit

TWO-WAY RF RANGING SYSTEM AND METHOD FOR LOCAL POSITIONING

FIELD OF THE INVENTION

The present invention relates generally to positioning systems, and, more specifically, to an apparatus and method for operating a positioning system in which a plurality of devices exchange messages with one another, enabling at least one of the devices to determine the relative positions of at least one other device in the system based on the information in, and time-of-arrival of, the message received from the other device.

BACKGROUND OF THE INVENTION

Local positioning systems are becoming an important enabler in mobile devices requiring navigation capabilities, especially in applications of autonomous vehicles and precision construction tools. Global positioning systems such as GPS provide only medium accuracy position information, usually no better than 10 cm, and requires a clear view of the sky to near the horizon. Local positioning systems, with either active or passive components distributed in a working volume, can allow much more accurate (<1 cm) positioning, and allows the user to expand the system as necessary to operate in even the most complex enclosed geometries.

Conventional local positioning systems include acoustic and laser ranging systems. Acoustic systems typically use transponder beacons to measure range within a network of devices, some of which are fixed to form the local coordinate system. Unfortunately, because of the properties of sound propagation through air, acoustic systems can only measure range to accuracies of a centimeter or more, and only over relatively short distances. Local positioning systems based on lasers utilize measurements of both the angle and range between a device and one or more reflective objects, such as prisms, to triangulate or trilateralate the position of the device. However, laser systems currently employ expensive pointing mechanisms that can drive the system cost to $30K or more.

A relatively low-cost (≦$2000) local positioning system able to determine 2D or 3D positions to accuracies of a few millimeters would enable a large set of potential products, in such application areas as precision indoor and outdoor construction, mining, precision farming, and stadium field mowing and treatment. The present invention overcomes the cost and accuracy limitations of conventional local positioning systems.

SUMMARY OF THE INVENTION

The system and method of the present invention provide a low-cost, yet highly accurate, local positioning system. Radio frequency (RF) signals are exchanged amongst devices to determine times of flight between the devices. The propagation speed of the RF signals does not vary as strongly with environmental conditions as does that of acoustic signals, providing superior accuracy in ranging. The spatial beamwidths of RF antennas used to exchange the signals are substantially wider than those of lasers, eliminating the need for costly pointing mechanisms.

In a preferred embodiment, the positioning system comprises a number of devices that exchange RF signals amongst themselves. Each device includes a transceiver for exchanging RF signals with other devices. The transceiver of each device periodically receives a message from each other device during time slots assigned to the other devices. Each device further includes a local clock for generating a local clock signal and receiver logic for determining a time of arrival, relatively to the local clock signal, of the message from each of the other devices. Transmitter logic is also present in each device for periodically transmitting messages to the other devices during a time slot assigned to that device, each transmitted message including information representing the determined time of arrival for at least one of the other devices. The message received from each other device includes information representing a time of arrival at the other device of a respective message transmitted by the receiving device. Finally, at least one of the devices in the system further includes ranging logic for determining a respective range to a number of the other devices, the determined respective range to a respective device of the other devices being determined as function of the determined time of arrival of the message from the other device and the time of arrival information in the message received from the other device.

In some embodiments, the local clock of a device includes a counter updated at a rate controlled by a local oscillator, the counter generating a local time value. In these embodiments, the device includes clock steering logic that includes a register storing an adjustment value, and an analog clock signal generator responsive to the adjustment value in the register for generating a steered clock signal. The steered clock signal is approximately synchronized with the local clock of one of the other devices.

In some embodiments in which a device includes clock steering logic, the receiver logic of the device is configured to utilize the steered clock signal to determine a difference between an edge (e.g., a zero crossing, associated with an upward or downward signal transition) in the steered clock signal and an edge in the received message from one of the other devices. In some of these embodiments, the device including clock steering logic includes logic for updating the adjustment value stored in the register in accordance with the difference between an edge in the steered clock signal and the edge in the message from the other one of the plurality of devices.

In some embodiments in which a device includes clock steering logic, the receiver logic of a device includes at least one windowing filter for integrating a received signal during a window time frame determined relative to the steered clock signal. In some of these embodiments, the window time frame used by the windowing filter is a sequence of window time frames, of different durations, used during a sequence of time periods to integrate the received signal. Sometimes, a last window time frame of the sequence of window time frames is at least 100 times smaller than a first window time frame of the sequence of window time frames.

BRIEF DESCRIPTION OF THE DRAWINGS

Additional objects and features of the invention will be more readily apparent from the following detailed description and appended claims when taken in conjunction with the drawings.

FIG. 2A is a schematic diagram of a two-way positioning system having at least four devices, in which the position of three static devices are known. The position of a fourth, possibly mobile, device is determined from the range from the fourth device to each of the other three devices.

Like reference numerals refer to corresponding parts throughout the several views of the drawings.

DETAILED DESCRIPTION OF THE DRAWINGS

Many conventional local positioning systems use time of flight measurements of a signal sent from a transmitter to a receiver to determine a respective range between the transmitter and the receiver. In some systems, the receiver is located on a device whose position is unknown and the transmitter on a device whose position is known. If there are a sufficient number of devices whose positions are known, the device whose position is unknown can receive transmissions from each of the devices whose positions are not known, determine the time of flight from each of these devices, determine the range to each of these devices, and subsequently trilateralate its own position.

For a receiver to determine the time of flight between a transmitter and the receiver using the time of arrival of the transmitted signal, the receiver must know the time at which the transmitter sent the signal. In some positioning systems, the transmitter may transmit at a time agreed upon in advance and known to the receiver. In other systems, the transmitter may encode the time at which the signal has been sent into the signal itself. In both cases, both the transmitter and receiver need a local time reference by which to measure time. Unless the time reference of the transmitter and receiver are synchronized, there will be significant errors in any determination of time of flight by the receiver. In a local positioning system, the transmitter and receiver generally reside in different devices, making synchronization difficult.

Figure 1:
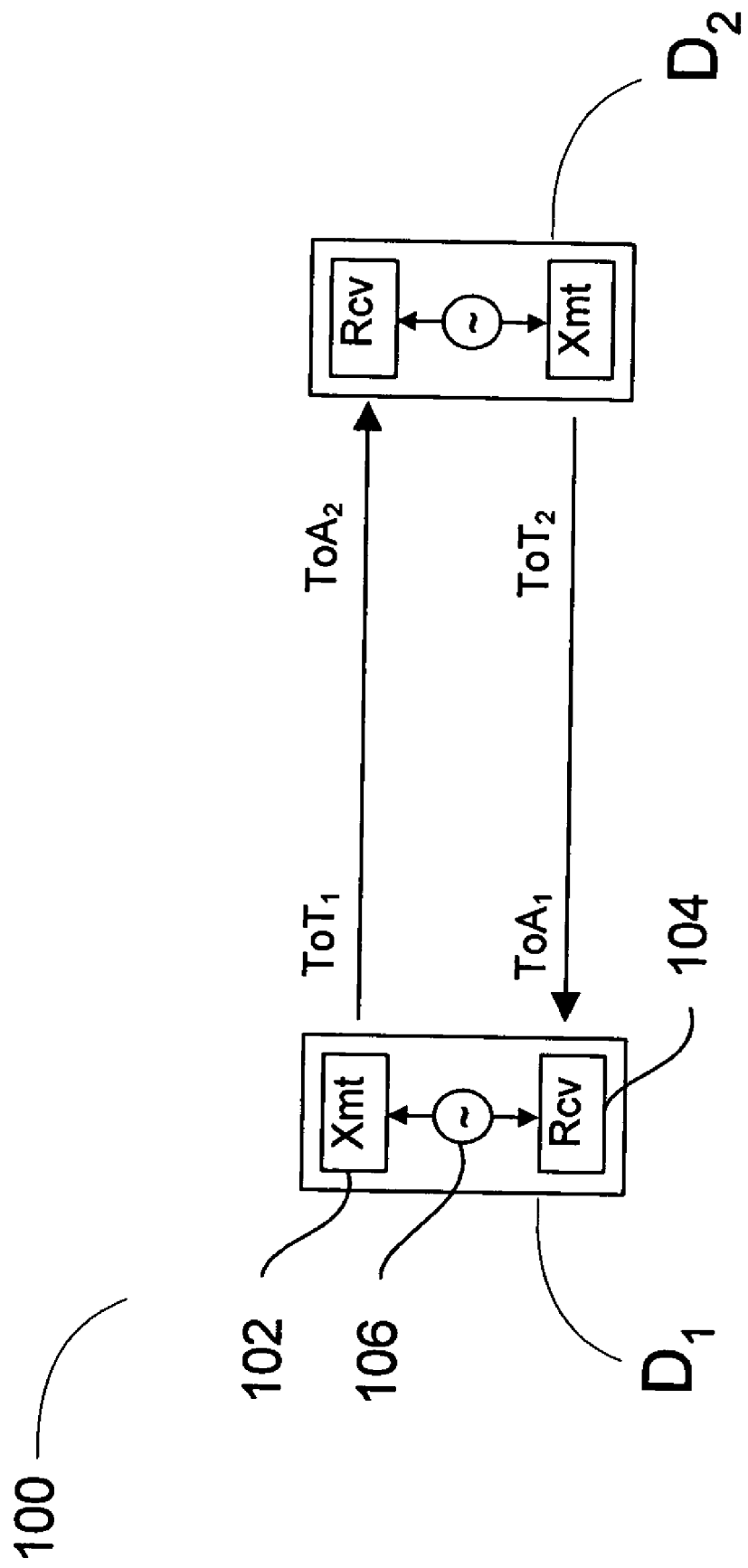
FIG. 1 is a schematic diagram illustrating two-way ranging.

To obviate the need for synchronization of the local time signal of each device in the positioning system, some embodiments of the present invention employ two-way ranging. FIG. 1 is a schematic diagram illustrating two-way ranging. A positioning system 100 comprises two devices, $D_1$ and $D_2$. Each device contains a receiver 102, a transmitter 104, and a local clock 106 for generating a local time signal. Each device transmits an RF signal at a time assigned to the particular device. $D_1$ transmits an RF signal at time $ToT_1$, as measured relative to $D_1$'s local time signal. The signal is subsequently received at $D_2$ at a time $ToA_2$, as measured relative to $D_2$'s local time signal. Additionally, $D_2$ transmits an RF signal at time $ToT_2$, as measured relative to $D_2$'s local time signal. This signal is subsequently received at $D_1$ at a time $ToA_1$, as measured relative to $D_1$'s local time signal.

The propagation speed of RF signals, c, is known to be $3.0*10^8$ m/s in a vacuum. In typical atmospheric conditions, the propagation speed of RF signals deviates from this value by less than 300 ppm (parts per million). By employing information about the altitude and other environmental factors the propagation speed of RF signals in the environment of the positioning system can be determined to within 100 ppm. Thus, an accurate estimate of the time of flight between the two devices, if it can be found, can be used to accurately estimate the range between the two devices.

To accurately determine the time of flight in a two-way ranging system, in some embodiments the local time signal of $D_1$ is taken to be the "correct" time. In these embodiments, the local time signal of $D_1$ may be superior in accuracy to that of other devices in the system. In other embodiments, the local time signals of all devices in the system may be equally likely to be inaccurate. Assuming $D_1$ is taken to be the "correct" time, the time as measured by $D_2$ will be offset by some amount $\Delta T$. Thus, the true time of flight of the signal transmitted from $D_1$ to $D_2$ is $ToA_2+\Delta T-ToT_1$. Similarly, the true time of flight of the signal transmitted from $D_2$ to $D_1$ is $ToA_1-ToT_2-\Delta T$. The offset between the clocks, $\Delta T$, is an unknown quantity, and prevents accurate determination of the range from either time of flight measurement taken alone. Examining instead the average time of flight, measured relatively to $D_1$'s local time signal $$([ToA_2+\Delta T-ToT_1]+[ToA_1-ToT_2-\Delta T])/2=(ToA_2+ToA_1-ToT_1-ToT_2)/2$$

reveals that the error due to the offset between the clocks, $\Delta T$ cancels out. Thus, an accurate estimate of the range, r, is given by the propagation speed of RF signals multiplied by the average time of flight $$r=c([ToA_2-ToT_1]+[ToA_1-ToT_2])/2.$$

The above discussion illustrates the basic principle of two-way ranging. It is desirable that a single device, for example a mobile device in a positioning system, be able to compute the range by itself. To employ two-way ranging in a positioning system consisting of multiple devices, the times of arrival at both devices must be known to compute the range accurately. In some embodiments, two-way ranging by $D_1$ is enabled by having $D_2$ encode its time of arrival ($ToA_2$) information in the RF signal transmitted to $D_1$. $D_1$ then decodes this information and, together with its measurement of time of arrival ($ToA_1$), determines the range to $D_2$.

Another complication arising in two-way positioning systems is the presence of a frequency, or rate, offset between the local time signals of the devices. This error can be mitigated if, in addition to recording times of arrival, the devices also record frequencies of arrival. The frequency of arrival relative to a receiver's time base can be measured, for example, by a carrier phase-locked loop (PLL), and can be used to estimate the fractional time-rate difference between the transmitting device's local time signal and the receiving device's local time signal. If local time signals of the two devices are equally likely to represent their nominal frequencies correctly, the average time-rate between the two devices' local time signals is the best time reference available. Since each device has a relative frequency measurement of the other device, each device can compute the frequency factor to convert any time measurement to a common definition of one second.

In some embodiments, a system-wide definition of one second is computed at each device by averaging the frequencies of arrival of messages received from each of the other devices. In other embodiments, one of the devices in the system has a local time value that is substantially more accurate than that of the other devices in the system. All devices in the system then employ measured frequency of arrival information from this device to arrive upon a common definition of one second in terms of the local time value of the devices.

Figure 2:
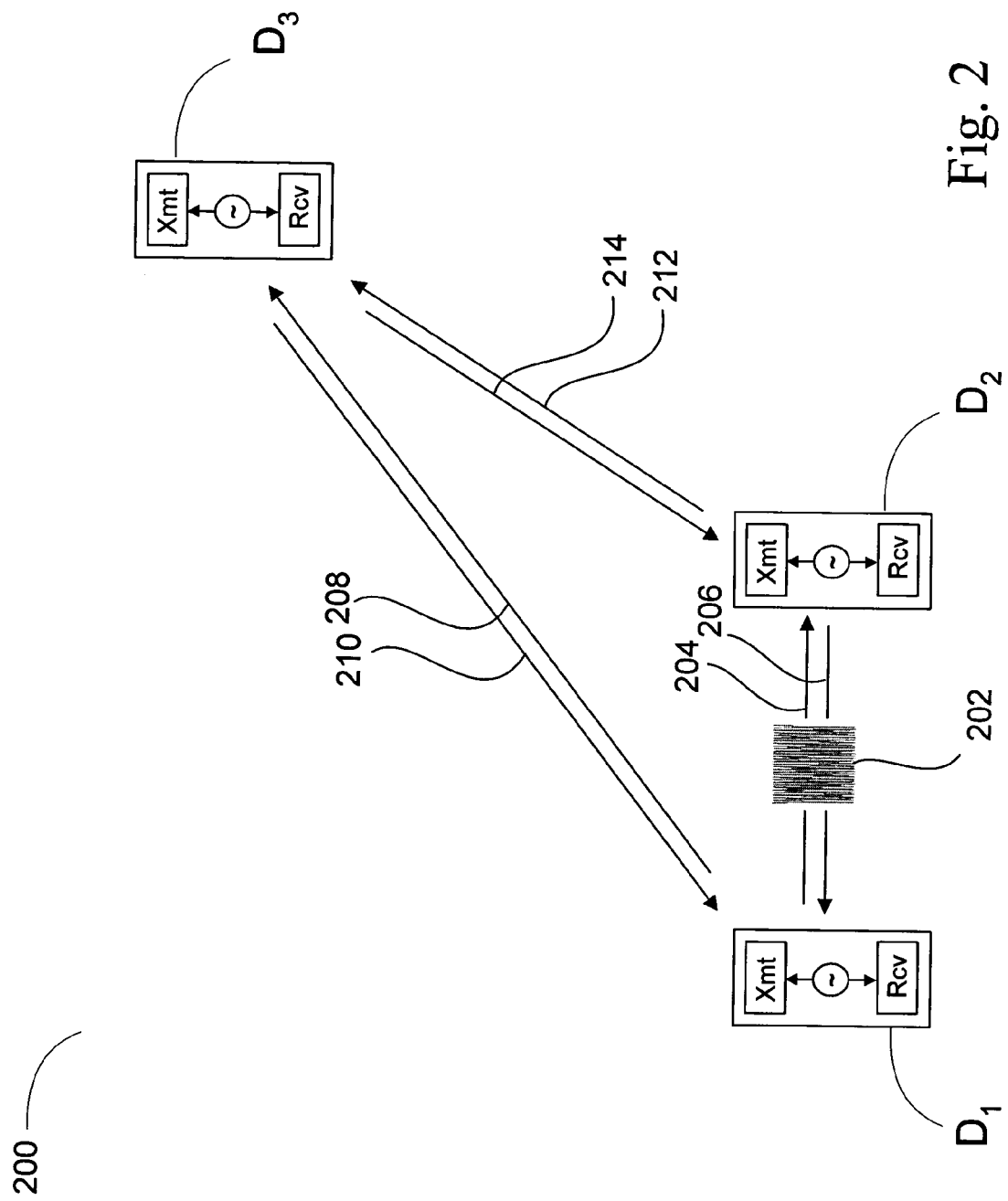
FIG. 2 is a schematic diagram of a two-way positioning system having more than two devices.

Next, the operation of two-way ranging in embodiments of the positioning system having more than two devices is explained. FIG. 2 is a schematic diagram of a positioning system 200. The system 200 includes a number of devices $D_1$, $D_2$, and $D_3$. Although in FIG. 2 there are only three such devices, in other embodiments more, or fewer, devices may be present. In some embodiments, the number of devices used will be adequate to provide unambiguous determination of the position of one of the devices relative to devices whose position have been surveyed. For example, in FIG. 2A, there are four devices, $D_1$, $D_2$, $D_3$ and $D_4$, in the positioning system. Assuming the positions of $D_1$, $D_2$, and $D_3$ are known (e.g., by surveying them in advance), the devices $D_1$, $D_2$, and $D_3$ are not collinear, and all of the devices are located within a two-dimensional plane, it is possible to determine the position of $D_4$ unambiguously from knowledge of the inter-device ranges $d_{14}$, $d_{24}$, and $d_{34}$ and the positions of devices $D_1$, $D_2$, and $D_3$. Algorithms for this purpose are well-known to one of skill in the art. See, for example "Quadratic time algorithm for the minmax length triangulation," H. Edelsbruneer and T. S. Tan, pp. 414-423 in *Proceedings of the 32nd Annual Symposium on Foundations of Computer Science*, 1991, San Juan, Puerto Rico, hereby incorporated by reference in its entirety. In other embodiments, the devices may not all be positioned in the same two-dimensional plane. In these embodiments, the position of at least four non-coplanar devices must be known to enable unambiguous determination of the position of a fifth device from knowledge of the range between the fifth device and each of the first four devices.

Returning attention to FIG. 2, in some embodiments each of the devices $D_1$, $D_2$ and $D_3$ exchange RF signals 202 with one another. $D_1$ receives RF signal 202 in transmission 206 from device $D_2$. The message in transmission 206 includes information representing the time of arrival of an earlier transmission 204 from device $D_1$ to device $D_2$. The time of arrival of transmission 206 at device $D_1$, together with the information in representing the time of arrival of transmission 204, is then used by $D_1$ to determine the range from $D_1$ to $D_2$. Similarly, $D_1$ receives transmission 210 from $D_3$. Transmission 210 contains information representing a time of arrival of earlier transmission 208 from device $D_1$ to device $D_3$. The time of arrival of transmission 210 at device $D_1$, together with the information in representing the time of arrival of transmission 208, is then used by $D_1$ to determine the range from $D_1$ to $D_3$. In some embodiments, more than one device includes ranging logic for determining ranges between devices in the system. For example, in FIG. 2, device $D_2$ receives transmission 214 from device $D_3$. Transmission 214 contains information representing a time of arrival of transmission 212 from device $D_2$ to device $D_3$. $D_2$ then employs ranging logic to determine the range from $D_2$ to $D_3$ based on the time of arrival of transmission 214 together with the time of arrival information contained therein.

Figure 3:
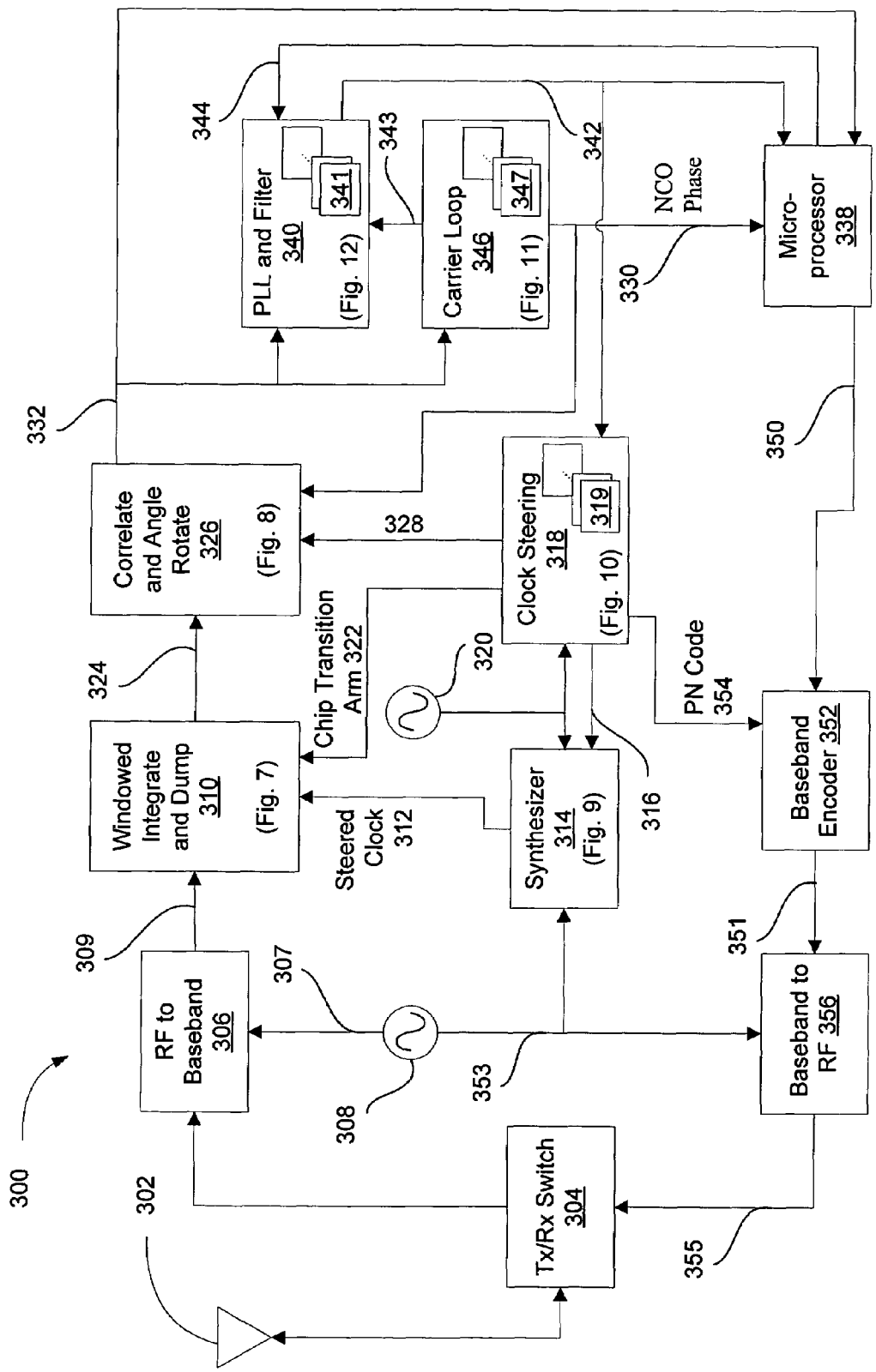
FIG. 3 is a block diagram of the transceiver of one of the devices (e.g. $D_1$ in FIG. 2) in the positioning system.

Thus, the devices in the positioning system determine the time of arrival of a received message and decode the time of arrival information sent in the messages received from other devices. Additionally, a device can transmit, to other devices in the system, messages including information representing the time of arrival of messages from other devices in the system. Referring to FIG. 3, a device 300 includes a number of functional blocks for receiving, processing, and transmitting RF signals. Antenna 302 receives RF signals from other devices in the positioning system. Tx/Rx switch 304 routes the received RF signal to the RF to baseband block 306. The RF to baseband block 306 mixes a carrier-frequency signal 307 generated by local RF oscillator 308 with the received RF signal and sends a resulting baseband signal 309 to the windowed integrate and dump circuit 310. In a preferred embodiment, the frequency of local RF oscillator 308 and the exchanged RF signals is 5.8 GHz. In other embodiments, the carrier frequency could be any frequency in the FCC ISM bands. For example, in other embodiments the carrier frequency could be in any of the following frequency bands: 0.915 GHz±0.013 GHz, 2.450 GHz±0.050 GHz, 5.800 GHz±0.075 GHz, 24.125 GHz±0.125 GHz, 61.250 GHz±0.250 GHz, 122.5 GHz±0.5 GHz, or 245 GHz±1 GHz. In still other embodiments, other frequency bands are possible. Some frequency bands, however, require the user to obtain an FCC or other agency license to operate the device(s) legally in the United States. Higher carrier frequencies ultimately enable better accuracy in range determinations. Lower carrier frequencies enable the use of lower-complexity and lower-cost circuitry.

In addition to the baseband signal 309, windowed integrate and dump circuit 310 receives a steered clock signal 312 from synthesizer 314. Synthesizer 314 utilizes an analog adjustment value 316 provided by clock steering circuit 318 and a signal from local oscillator 320 to generate the steered clock signal 312. In a preferred embodiment, local oscillator 320 generates a 100 MHz sinusoidal signal. In other embodiments, the frequency of local oscillator 320 could be any frequency in the range from 3.3 MHz to 200 MHz. The frequency of local oscillator 320 is used for internal digital signal processing in a preferred embodiment of the device, so higher frequencies enable higher data-rate communications. In particular, a higher frequency allows faster digital sampling of the baseband signal 309 in windowed integrate and dump circuit 310 to sample baseband signals having higher data rates. Baseband signals having higher data rates, in turn, enable a more rapid exchange of RF signals between the devices in the system, ultimately allowing more devices to be present in a system.

Windowed integrate and dump circuit 310 uses steered clock 312 and chip transition arm 322 to process the baseband signal 309 into a set of digital signals 324. More detailed discussion of the operation of windowed integrate and dump circuit 310 is provided below, in reference to FIG. 7.

Windowed integrate and dump circuit 310 provides digital signals 324 to correlate and angle rotate circuit 326. Clock steering circuit 318 provides a received pseudo-noise (PN) code 328 to the correlate and angle rotate circuit 326.

In some embodiments, received PN code 328 is generated by clock steering circuit 318 based on the identity of the device from which the current RF signal has been received. In other embodiments, the received PN code 328 is the same for RF signals received from all devices. Carrier loop 346 provides a numerically controlled oscillator (NCO) phase 330, representing the phase difference between the signal 307 generated by local RF oscillator 308 and the carrier signal of the received message, to the correlate and angle rotate circuit 326. NCO phase 330 and PN code 328 are used by the correlate and angle rotate circuit 326 to process digital signals 324 into despread signals 332. Details of the operation of the correlate and angle rotate circuit 326 are provided below, in conjunction with the discussion of FIG. 8.

A microprocessor 338 uses despread signals 332 to determine the information encoded in the received RF signal. Microprocessor 338 receives an adjustment value 342 from PLL and filter 340 and receives NCO phase 330 from carrier loop 346. This information is used by the microprocessor 338 to compute a time of flight of the received RF signal, the time of flight then being stored in a register in the microprocessor 338.

Periodically, microprocessor 338 generates a baseband message 350 containing the time of arrival information of the RF signals received from other devices in the system. The baseband message 350 is sent to a baseband encoder 352. Baseband encoder 352 mixes the baseband message and a transmit PN code 354 provided by clock steering circuit 318 to spread the baseband message, resulting in the generation of spread baseband signal 351. The spread baseband signal 351 is conveyed to a baseband to RF converter 356, where it is upconverted to a carrier frequency by mixing it with a carrier-frequency signal 353 provided by local RF oscillator 308. The upconverted and spread signal 355 is then passed through the Tx/Rx switch 304 to antenna 302. Antenna 302 transmits the message to the other devices in the system.

Having provided a brief overview of the operation of the transceiver, receiver logic, and transmitter logic of device 300, attention is now turned to the generation of steered clock signal 312, NCO phase 330 and adjustment value 342. Clock steering circuit 318 includes a number of registers 319. In some embodiments, each register corresponds to one of the other devices in the system, and contains a value that represents the time difference between the local clock signal of device 300 and that of the other device. Based on this value, clock steering circuit 318 generates analog values 316 that are used by synthesizer 314, together with a clock signal provided by local oscillator 320, to generate the steered clock signal 312. Steered clock signal 312 is generated so as to be approximately synchronized to the local clock of the device from which the message currently being received has been sent. Further details of the operation of synthesizer 314 and clock steering circuit 318 are provided below in conjunction with the discussion of FIG. 9 and FIG. 10, respectively.

NCO phase 330 is generated by carrier loop 346. Carrier loop 346 includes a number of carrier locked loops 347. In some embodiments, the number of carrier locked loops is equal to the number of devices other than device 300 in the system, each carrier locked loop being used to track the carrier phase of messages from one of the other devices. In other embodiments, a device includes only one carrier locked loop used to track the carrier phase of messages from all other devices. The operation of carrier loop 346 is discussed in greater detail below, in conjunction with the discussion of FIG. 11.

Adjustment value 342 is generated by phase-locked loop (PLL) and filter 340. PLL and filter 340 includes a number of channel modules 341. In some embodiments, the number of channel modules is equal to the number of devices other than device 300 in the positioning system, each channel module used to track the difference between the local clock signal of the device and that of one of the other devices. In other embodiments, fewer channel modules are present, used to track the difference between the local clock signal of the device and that of more than one of the other devices. PLL and filter 340 receives command and control information 344 from microprocessor 338 and despread signals 332 from correlate and angle rotate circuit 326. Additionally, PLL and filter 340 receives automatic frequency control (AFC) error signal 343 from carrier loop 346. The operation of PLL and filter 340 is discussed in greater detail below, in conjunction with the discussion of FIG. 12.

Figure 5:
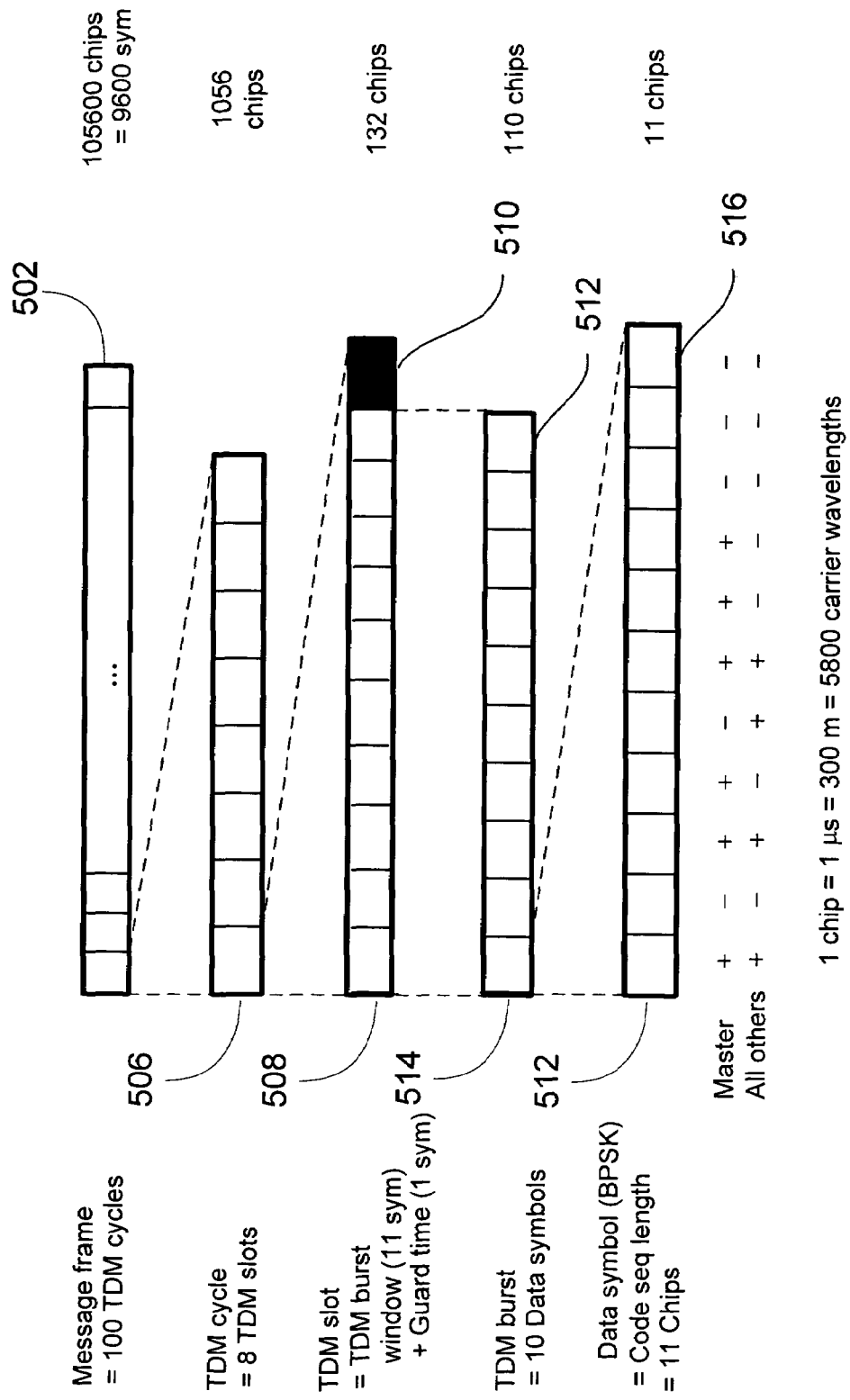
FIG. 5 is a timing diagram illustrating the location and the structure of the time slot for periodically transmitting messages in accordance with an embodiment in which the positioning system consists of eight devices.

To enable more than one device to transmit messages via signals of the same RF frequency, a multiple-access communication protocol is necessary. The embodiments of the present invention described here use a time-division multiple access (TDMA) communication protocol to solve this problem. FIG. 5 illustrates the details of a TDMA protocol to be used in a positioning system including eight devices. Message frame 502 is the largest division of time in the protocol. The message frame is repeated periodically in time, allowing for repeated exchanged of RF signals amongst the devices. In a preferred embodiment, message frame 502 is 0.1 seconds in duration. The duration of message frame corresponds to an amount of time for which it is expected that all devices in the system will remain stationary. Thus, in some embodiments adapted to applications involving slowly moving devices, message frame could be as long as one minute in duration. In other embodiments, the duration could be as short as 0.01 seconds. Shorter durations, however, may ultimately limit the number of devices that can be included in a positioning system.

Message frame 502 comprises a number of TDM cycles 506. In some embodiments, during each TDM cycle 506, each device in the system transmits an RF signal including part of a message. The message from each device so transmitted is not complete until the RF signals from every TDM cycle in the message frame 502 is complete. In a preferred embodiment, each message frame 502 consists of 800 TDM slots. The number 800 is chosen because it is divisible by a variety of integers (e.g. 4, 5, 8, 10 16, 20, 25, 32) allowing equal partitioning of TDM slots amongst the devices in the system for systems having a variety of numbers of devices. In a preferred embodiment, each TDM cycle 506 comprises eight TDM slots 508, each TDM slot being assigned to a respective one of eight devices in the system. A device only transmits RF signals during its assigned TDM slot.

If each device were to transmit for the entire duration of its TDM slot 508, however, interference between the transmissions of different devices would still be possible. The finite propagation speed of RF signals and uncertainty in the local time value (used to determine the current position in the message frame) of any given device both contribute to this potential problem. The finite propagation speed of RF signals causes an RF signal to be present in the space between the devices of the system for some time after a given device ceases transmission of an RF signal. Thus, were a device to stop transmitting precisely at the end of its assigned slot, the RF signal would not reach all the other devices until after the beginning of the next time slot. The device to which the next time slot is assigned would have already begun transmitting, and interference would occur. In a similar way, if the local time values of two devices are not in precise agreement, interference will occur when two devices whose local time value indicates that the current time belongs to their assigned TDM slot begin transmitting.

To eliminate the possibility that the transmissions of two devices in the system will interfere, in some embodiments each TDM slot 508 comprises a guard time 510 and ten data symbols 512. In a preferred embodiment, the duration of the guard time 510 is at least twice the maximum time of flight for an RF signal between any two devices in the system, guaranteeing that transmissions from distinct devices never overlap. In some embodiments, the guard time 510 is placed at the beginning of the TDM slot 508. Alternately, one-half the guard time can be allocated to the beginning of the TDM slot 508 and one-half of the end of TDM slot 508.

The portion of a TDM slot 508 in which information is transmitted is referred to as a TDM burst 514. In a preferred embodiment, one TDM burst 514 contains ten data symbols 512. Alternatively, more or fewer data symbols 512 may be contained in each TDM burst 514. Each data symbol 512 includes a number of chips 516. A chip is the smallest logical division of time in the message frame 502. In a preferred embodiment, a chip contains a constant-keyed value of a binary phase-shift keyed (BPSK) version of the carrier signal. The keying of the carrier occurs at a rate referred to as the chip rate, which is inversely related to the duration of one chip. In the particular BPSK modulation scheme used in the preferred embodiment, the phase of the carrier is shifted by either 0° or 180° corresponding to values of logic high (1) and logic low (0), respectively. In other embodiments of the invention, other modulation techniques, including, but not limited to, frequency shift keying (FSK) and quadrature phase shift keying (QPSK) could be used to encode each chip of the carrier.

In a preferred embodiment, each data symbol 512 includes eleven chips 516 which correspond to one of four possible length-11 Barker code sequences. The first two Barker code sequences (10110111000 and its logical complement, 01001000111) are transmitted only by a device referred to as a "master device". The master device is responsible for synchronizing the local time values of all other devices in the system relative to the TDM frame. Any transmission containing these chip sequences can be unambiguously interpreted as having come from the master device, making the synchronization task simpler. In a burst assigned to it, the master device may transmit one of two chip sequences in each data symbol 512 of the burst, logic high (10110111000) or logic low (01001000111). The other two Barker code sequences (10101100000 and its logical complement, 01010011111) are assigned to all devices in the system that are not the master device. Thus, any transmission containing these code sequences cannot be unambiguously interpreted as having come from a particular device. Devices other than the master device can transmit one of two chip sequences in each data symbol 512 of a burst, logic high (10101100000) or logic low (01010011111).

In other embodiments, pseudo-random noise (PN) codes other than Barker codes are used to determine the chip sequences for the master device and other devices. Gold codes and Kasami codes are examples of other PN codes known to those of skill in the art. In other embodiments, the chip sequence for the master device may be the same as that of the other devices. Additionally, there may be more or fewer than eleven chips in each data symbol. For example, Barker sequences of lengths 2, 3, 4, 5, 7, 11, or 13 may be used. In still other embodiments Gold, Kasami, Frank, Chu, and Huffman sequences of various lengths may be used. For a data symbol of fixed duration in time, more chips per symbol requires greater bandwidth, but provides more accurate estimation of time of arrival and, in turn, range. Fewer chips per symbol require less bandwidth, but provide less accurate estimation of time of arrival and, in turn, range.

Figure 4:
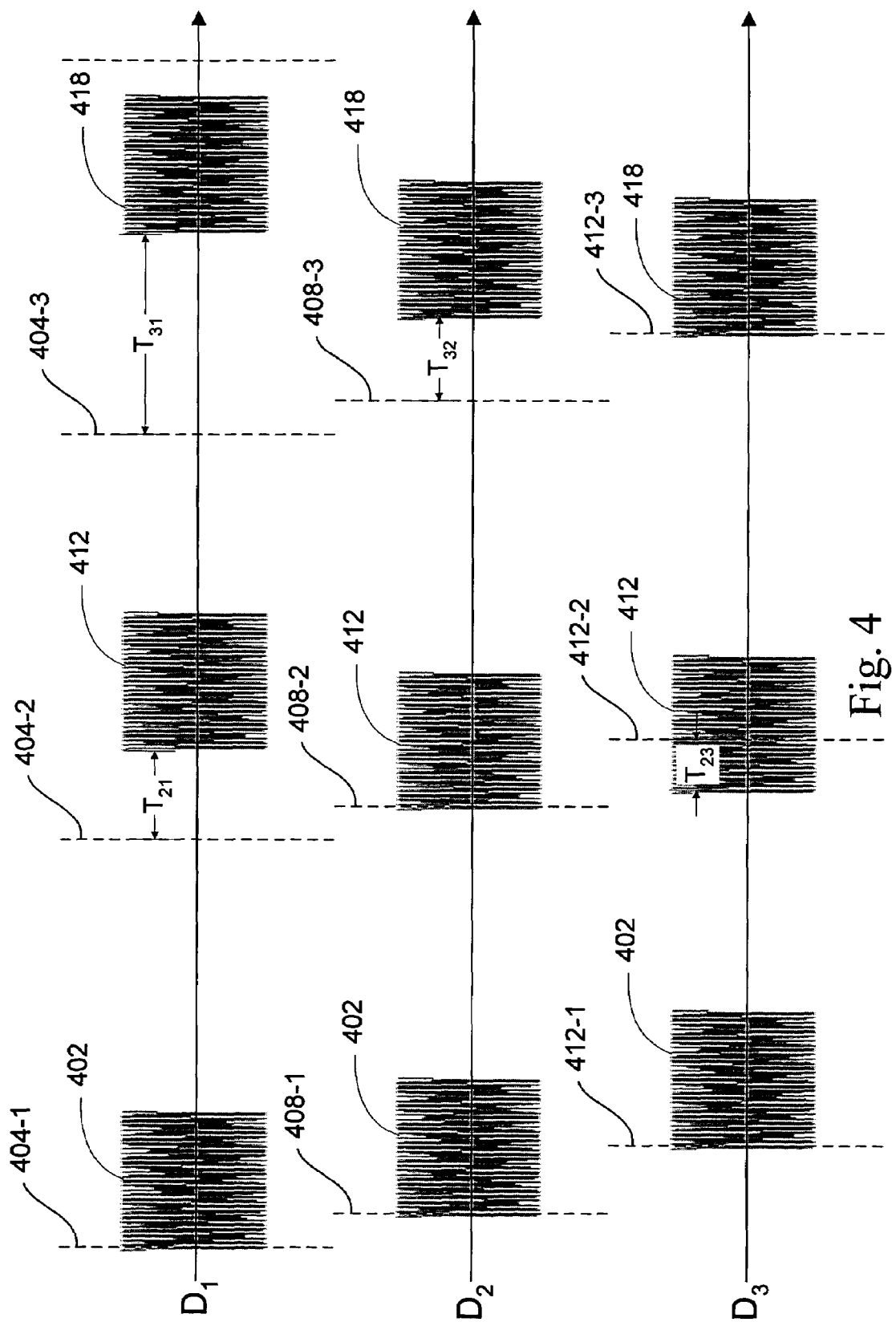
FIG. 4 is a timing diagram illustrating the exchange of RF signals amongst the devices in an exemplary system having three devices, as illustrated in FIG. 2.

Next described is the manner in which ranges are determined from the time of arrival measured relative to the local time values, defined relative to the TDM message frame, of the devices in a positioning system. FIG. 4 is a timing diagram illustrating the exchange of RF signals amongst the devices in accordance with an embodiment in which there are three devices in the system, $D_1$, $D_2$ and $D_3$. $D_1$, the master device, transmits RF signal 402 at the appropriate start time 404-1 of the TDM burst assigned to the master in the message frame. The message frame also contains time markers 404-2 and 404-3 corresponding to the start time of the TDM bursts of the other two devices. RF signal 402 is received at device $D_2$ with a time of arrival that is synchronous with the start time 408-1 of the burst assigned to the master in the message frame as estimated by device $D_2$. This synchronicity of the time of arrival of RF signal 402 and start time 408-1 occurs for devices $D_1$ and $D_2$ separated by any distance, so long as $D_1$ is designated as the master. This is a consequence of the initialization scheme from which the devices in the system estimate the timing of the message frame, discussed in detail below in conjunction with the discussion of FIG. 13 and FIG. 14. All the devices in the system estimate the timing of the message frame based on the time of receipt of special data symbols from the master device during an initialization sequence. Thus, each device's estimation of the timing of the message frame is delayed by an amount equal to the time of flight between the master device and the device in question. Referring to FIG. 4, the start time of the message frame 412-1 as estimated by $D_3$ is later than the start time of the message frame 408-1 as estimated by $D_2$, which indicates that the time of flight between $D_3$ and the master is greater than the time of flight between $D_1$ and the master. The relative positions of the devices $D_1$, $D_2$ and $D_3$ in FIG. 2 represent one possible set of positions of the devices in the system consistent with the timing depicted in FIG. 4. RF signal 402 is received at device $D_3$ with a time of arrival that is synchronous with the beginning 412-1 of the message frame as estimated by device $D_3$.

$D_2$ next transmits RF signal 412 at the start time 408-2 of the burst as estimated by $D_2$. $D_1$ receives RF signal 412 later than the start time 404-2 of the burst assigned to $D_2$. The difference between the time of arrival of RF signal 412 at $D_1$ and the start time 404-2 of the burst assigned to $D_2$ defines a time of arrival, $T_{21}$. $D_3$ receives RF signal 412 earlier than the start time 412-2 of the burst assigned to $D_2$ as estimated by $D_3$. The difference between the time of arrival of RF signal 412 at $D_3$ and the start time 412-2 of the burst assigned to $D_2$ as estimated by $D_3$ defines another time of arrival, $T_{23}$.

Finally, $D_3$ transmits RF signal 418 at the start time 412-3 of the burst assigned to $D_3$ as estimated by $D_3$. $D_1$ receives RF signal 418 later than the start time 404-3 of the burst assigned to $D_3$. The difference between the time of arrival of RF signal 418 at $D_1$ and the start time 404-3 of the burst assigned to $D_3$ defines a time of arrival $T_{31}$. $D_2$ receives RF signal 418 later than the start time 408-3 of the burst assigned to $D_3$ as estimated by $D_2$. The difference between the time of arrival of RF signal 418 at $D_2$ and the start time 408-3 of the burst assigned to $D_3$ as estimated by $D_2$ defines another time of arrival $T_{32}$.

To determine a two-way range, a device in the system needs to have access to information beyond its own measurements of times of arrival of RF signals from other devices in the system. Thus, in some embodiments, RF signal 402 contains information representing the time of arrival of RF signal 412 and RF signal 418 at device $D_1$ in earlier message frames. Similarly, RF signal 412 contains information representing times of arrival RF signal 402 and RF signal 418 at device $D_2$ in earlier message frames. RF signal 418 contains information representing times of arrival RF signal 402 and RF signal 412 at device $D_3$ in earlier message frames. In some embodiments, then, each device in the system can determine the range from itself to any of the other devices in the system.

Because $D_1$ is the timing master, there is essentially no delay between the beginning of a transmission by $D_1$ and the time at which $D_2$ expects to begin receiving this message (e.g. $T_{12} \approx 0$). However, the time that elapses between the beginning of the transmission of RF signal 412 by $D_2$ and the time 404-2 at which $D_1$ expects to begin receiving is actually twice the time of flight between the two devices—one time of flight attributable to $D_2$'s delayed mark of the beginning of the frame and the other time of flight attributable to the actually propagation time it takes for $D_2$'s transmission to reach $D_1$. Thus, the range between $D_1$ and $D_2$ is easily estimated as $cT_{21}/2.$ An entirely analogous analysis reveals that the range between $D_1$ and $D_3$ is estimated as $cT_{31}/2.$ Finally, the range between $D_2$ and $D_3$ can be estimated as $c(T_{32}+T_{23})/4,$ using the average time of arrival of messages exchanged between $D_2$ and $D_3$. In this way, clock offset errors between $D_3$ and $D_2$ introduce no error in the computation of range, as explained above in reference to FIG. 2A.

Although the example provided involves only three devices, the approach is applicable to a ranging or positioning system having an arbitrary number of devices. The position of some of the devices may be known, and that of other devices unknown. Determining the range between every pair of devices provides sufficient information to determine the position of one of the devices relative to the other devices whose position is known. See, for example "Quadratic time algorithm for the minmax length triangulation," H. Edelsbruneer and T. S. Tan, pp. 414-423 in *Proceedings of the 32nd Annual Symposium on Foundations of Computer Science*, 1991, San Juan, Puerto Rico, hereby incorporated by reference in its entirety. Additionally, techniques such as receiver autonomous integrity monitoring (RAIM), well-known to those of skill in the art of global positioning systems (GPS), may be used to select various subsets of the ranges estimated, determine the relative position(s) of one or more devices in the system, compare the determined position(s) with those so determined using other subsets of the ranges, and arrive at an optimal estimate of relative position(s) of all devices in the system. See "Mathematical aspects of GPS RAIM," F. van Diggelen and A. Brown, pp. 733-738 in *IEEE Position Location and Navigation Symposium*, 1994, Las Vegas, Nev., USA, hereby incorporated by reference in its entirety.

Figure 6:
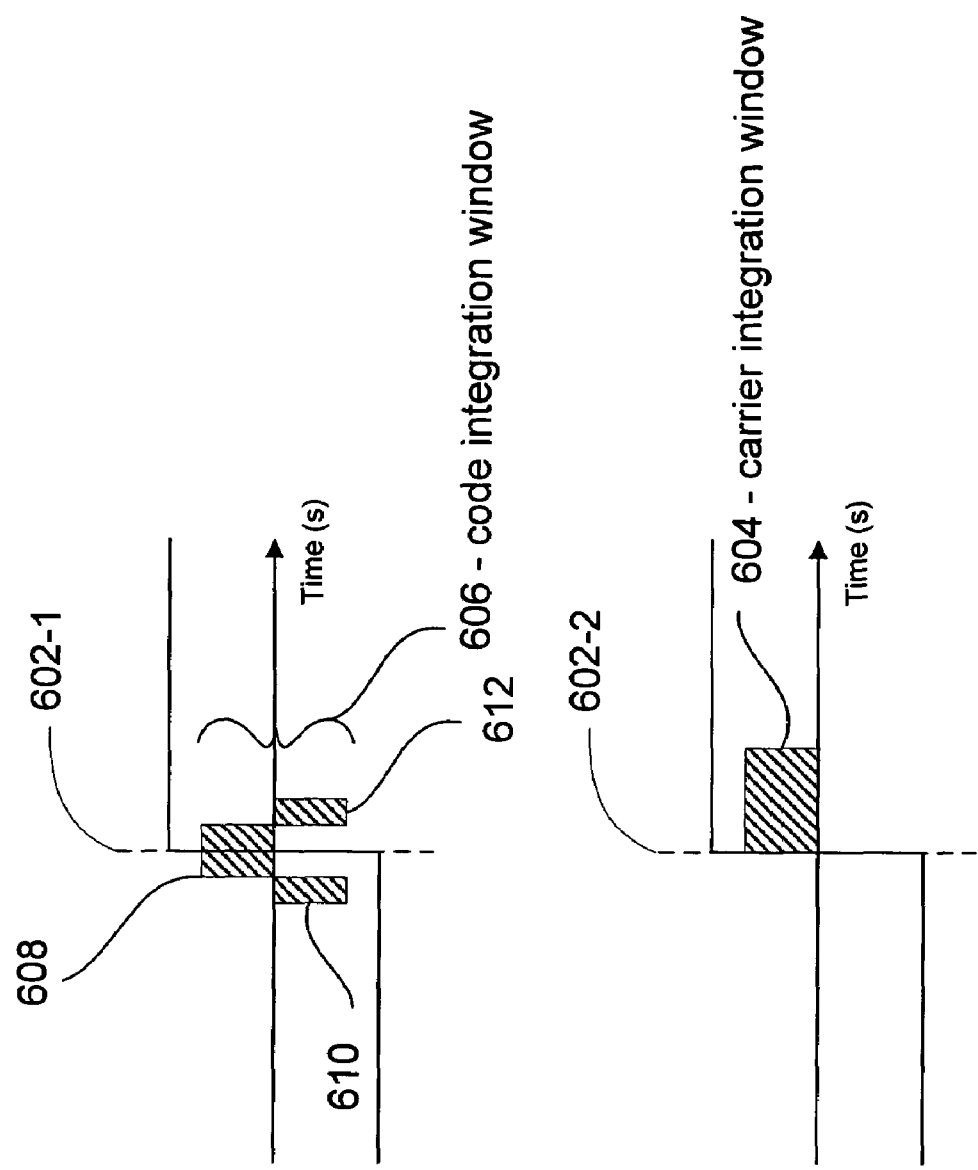
FIG. 6 illustrates the operation of a W-windowed and Q-windowed integration of received RF signals to reject multipath interference.

As the discussion above reveals, accurate determination of range requires precise measurement of time of arrivals. In some applications of local positioning systems, including indoor construction applications, the arrival of transmitted messages along more than one path of propagation can introduce error in the measurement of the time of arrival of the message via the direct, line of sight path, on which two-way ranging relies. Next described is a method of suppressing this so-called multipath interference in received signals, yielding accurate estimates of the time of arrival of a message. This is accomplished by processing received messages through windowing filters that integrate the received message over a time frame. Referring to FIG. 6, carrier integration window 604 and code integration window 606 are employed in windowing filters in some embodiments. Code integration window 606 includes opposite-sign integration regions 610 and 612 as well as an early-late integration region 608. If, as part of a received message, chip transition 602-1 arrives at a time later than half the total window width, the product of the window and the received signal level integrates to a value having a magnitude of substantially zero. If, on the other hand, chip transition 602-1 arrives before the end of the window, as depicted in FIG. 6, the product of the window and the received signal level integrates to a value representing the time delay between the center of the window and the chip transition. In some embodiments of the present invention, a steered clock signal that is approximately synchronized with a local clock in the device from which the received message is transmitted is available to the windowing filter. Thus, if the center of the window is aligned with an edge in the steered clock signal, the result of integrating the product of the window and the received signal is indicative of the time offset between the steered clock and the clock of the device transmitting the received message, absent any multipath interference. Use of code integration window 606 in this way, referred to hereinafter as "W-windowed integration" results in multipath chip transitions of sufficient delay having no effect on the result of the integration, integrating the product of the window and the received signal. This result can be used as a correction input to the code tracking loop, and hence is effectively eliminated from the channel. W-windowed integration of GPS signals is described in U.S. Pat. No. 6,125,135 "System and Method of Demodulation Global Positioning System Signals," which is hereby incorporated by reference in its entirety.

Carrier integration window 604 operates in a different manner to reject multipath interference. Integration of the product of window 604 and a received message is performed for a time frame determined by the width of window 604. If, as part of a received message, chip transition 602-2 arrives later than the total window width, the product of the window and the received signal level integrates to a value having a magnitude substantially different than zero. Thus, even if the leading of window 604 is aligned with the true chip transition 602, a multipath error affects the result of any given integration. The spreading PN code sequence, however, is designed so that exactly half of the adjacent code values are the same. Thus, there will be as many positive multipath errors as negative, all of the same magnitude for a fixed multipath trajectory. If the result of the integration is then used, for example, as an input to a phase-locked loop with dynamics having a time constant substantially greater than the chip length, the opposite errors will cancel one another and have no effect on the loop's ability to track the phase of the carrier. Use of carrier integration window 604 in this way is hereinafter referred to as "Q-windowed integration."

In some embodiments, both W-windowed and Q-windowed integration are used multiple times, employing a sequence of window time frames (or, equivalently, window widths) to enhance the accuracy of time of arrival measurement. When first initialized, the steered clock signal of a device may not be precisely aligned with chip transitions in the received message. Thus, wide window widths in both the W-windowed and Q-windowed integration must be used to ensure that the chip transition in the message received in the line of sight path is detected. After reception of each message from a given device, however, the adjustment value in clock steering circuit 318 (FIG. 3) is updated and provided to synthesizer 314, resulting in a steered clock signal that is more accurately aligned with chip transitions in the received message. Thus, a narrower window time frame may subsequently be used in the windowing filters without a possibility of failing to detect the chip transition in the message received in the line of sight path. Use of narrower time frames in the windowing filters results in rejection of more multipath signals, as the minimum time delay (and corresponding path length) that can be rejected decreases. In some embodiments, W-windowed integration is performed over time frames chosen from amongst the following: 200 ns, 40 ns, 5 ns, and 1 ns. The corresponding Q-windowed integration in these embodiments is performed over time frames chosen from amongst the following: 100 ns, 20 ns, 2.5 ns, and 0.5 ns. The sequence of time frames employed, for both Q-windows and W-windowed integration, is not monotonically decreasing in some embodiments. For example, Q-windowed integration may be performed once over a time period of 100 ns and subsequently over a time period of 20 ns. If carrier lock is lost in going from the first time frame to the second time frame, however, the next Q-windowed integration may be performed over a time window of 100 ns.

Figure 7:
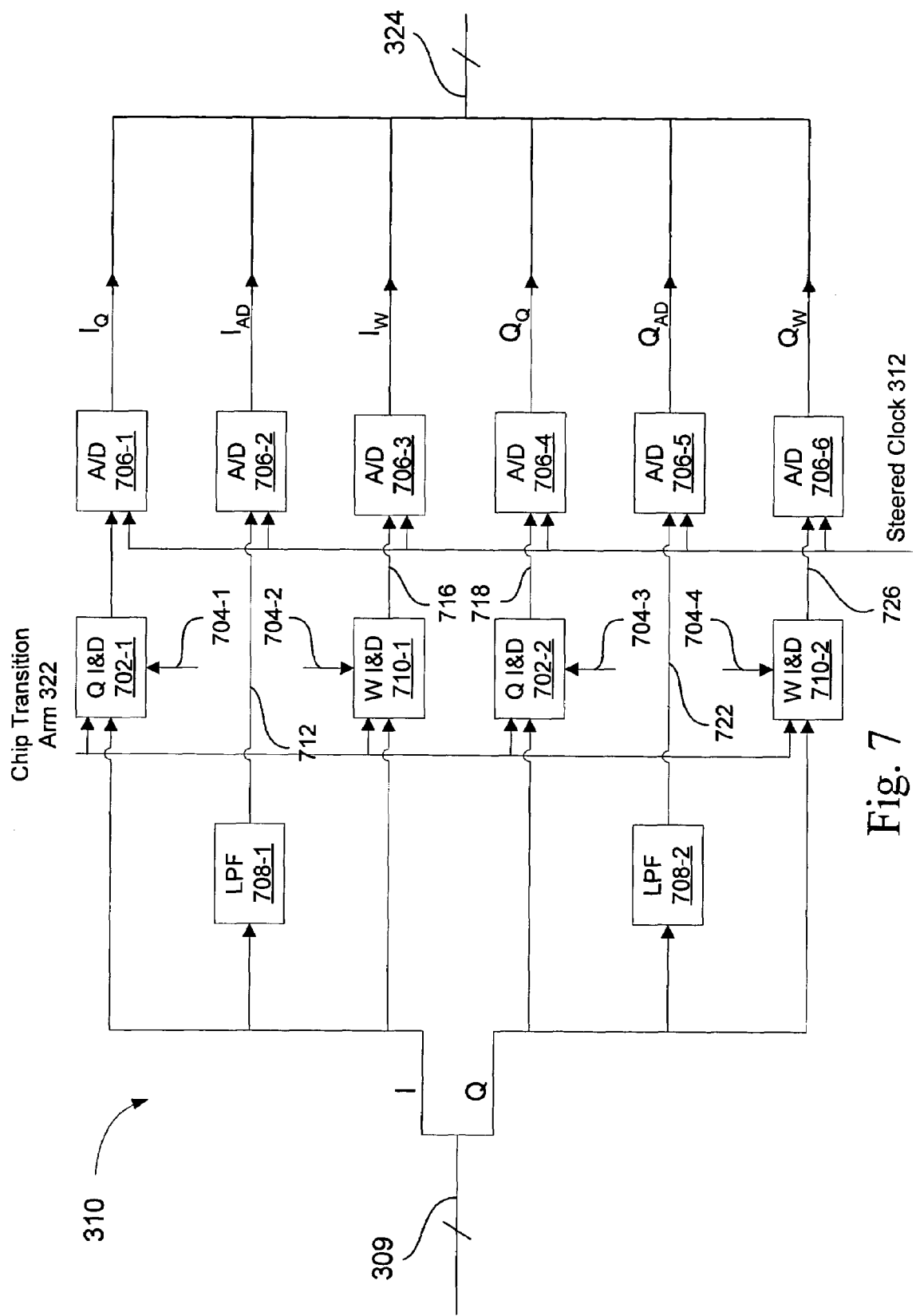
FIG. 7 is a block diagram of the windowed integrate and dump block of one of the devices in the positioning system.

To see how windowed integration is incorporated in some devices designed in accordance with the present invention, FIG. 7 depicts the windowed integrate and dump circuit 310 (FIG. 3) of one of the devices in an embodiment of the system. Referring to FIG. 7, windowed integrate and dump circuit 310 includes two low pass filters (LPF) 708, two Q-windowed integrate and dump circuits (Q I&D) 702, two W-windowed integrate and dump circuits (W I&D) 710, and six analog-to-digital converters (A/D) 706. The inphase component I of the baseband signal 309 is filtered by low pass filter 708-1, integrating the component I over a window approximately equal in duration to the sampling period. The filtered output 712 of low pass filter 708-1 is then sampled by analog-to-digital (A/D) converter 706-2, resulting in sampled data stream $I_{AD}$. A/D converter 706-2 utilizes steered clock 312 to perform this sampling. Similarly, the quadrature component Q of the baseband signal 309 is filtered by low pass filter 708-2, and the filtered output 722 is sampled by A/D converter 706-5, resulting in sampled data stream $Q_{AD}$.

The inphase component I is also integrated by Q integrate and dump (Q I&D) circuit 702-1 and sampled by A/D 706-1, resulting in sampled data stream $I_Q$. Q I&D circuit 702-1 integrates incoming signals over a time frame defined relative to chip transition arm 322. The inphase component I is also integrated by W integrate and dump (W I&D) circuit 710-1 over a time frame defined relative to chip transition arm 322 and sampled by A/D 706-3, resulting in sampled data stream $I_W$. The time frames used by Q I&D circuit 702 and W I&D circuit 710 are controlled by control signals 704. In some embodiments, control signals 704 are provided by microprocessor 338 (FIG. 3), allowing the width of the integration to be performed multiple times over a sequence of time periods, the integration occurring during a sequence of window time frames of different durations. Similarly, the quadrature component Q is integrated by Q I&D circuit 702-2 over a time frame defined relative to chip transition arm 322 and sampled by A/D 706-4, resulting in sampled data stream $Q_Q$. The quadrature component Q is also integrated by W I&D circuit 710-2 and sampled by A/D 706-6, resulting in sampled data stream $Q_W$.

When the receiver in a device is initialized, the steered clock signal may not be aligned with chip transitions in the received signal. Thus, it may be preferable to use the sampled data streams $I_{AD}$ and $Q_{AD}$ that have not been processed by windowing filters. To accommodate this, a device operates in two distinct modes of operation—one in which initial acquisition of the received message is attempted (ACQ) and another in which tracking of both the phase of the carrier frequency signal and the time delay of chip edges relative to the local clock signal is attempted (TRK). Choice of the operating mode is generally under the control of a microprocessor (e.g., microprocessor 338, FIG. 3).

Figure 8:
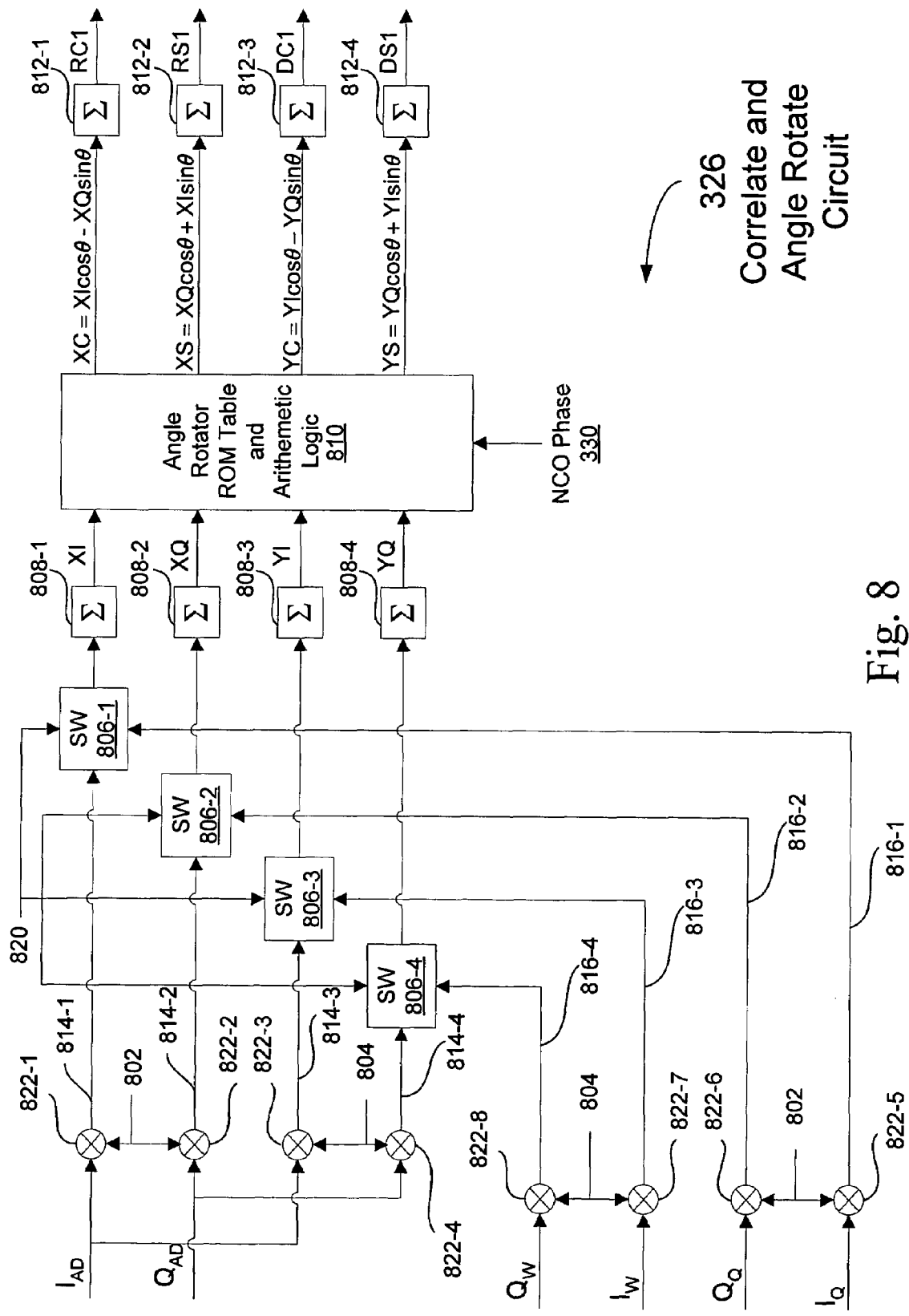
FIG. 8 is a block diagram of the correlate and angle rotate blocks of one of the devices in the positioning system.

Referring to FIG. 8, the correlate and angle rotate circuit 326 is operable in ACQ or TRK mode, as determined by control signal 820. Correlate and angle rotate circuit 326 includes angle rotator ROM table and arithmetic logic 810 and a number of switches 806, one-chip summers 808, and one-symbol summers 812. In ACQ mode of operation, data stream $I_{AD}$ is multiplied with on-time PN code 802 by multiplier 822-1. The resulting data stream 814-1 is passed by switch 806-1 to one-chip summer 808-1, producing output signal XI. Similarly, data stream $Q_{AD}$ is multiplied with on-time PN code 802 by multiplier 822-2, and passed by switch 806-2 to one-chip summer 808-2, resulting in output signal XQ.

In ACQ mode, data stream $I_{AD}$ is also multiplied with early-late PN code 804 by multiplier 822-3, and passed by switch 806-3 to one-chip summer 808-3, resulting in output signal YI. Additionally, data stream $Q_{AD}$ is multiplied with early-late PN code 804 by multiplier 822-4, and passed by switch 806-4 to one-chip summer 808-4, resulting in output signal YQ.

After receiving a number of messages from a given other device in the system, a device typically enters TRK mode. In TRK mode, data stream $I_Q$ is multiplied with on-time PN code 802 by multiplier 822-5. The resulting data stream 816-1 is passed by switch 806-1 to one-chip summer 808-1, producing output signal XI. Similarly, data stream $Q_Q$ is multiplied with on-time PN code 802 by multiplier 822-6, and passed by switch 806-2 to one-chip summer 808-2, resulting in output signal XQ. Data stream $I_W$ is multiplied with early-late PN code 804 by multiplier 822-7, and passed by switch 806-3 to one-chip summer 808-3, resulting in output signal YI. Additionally, data stream $Q_W$ is multiplied with early-late PN code 804 by multiplier 822-4, and passed by switch 806-4 to one-chip summer 808-4, resulting in output signal YQ.

In both modes of operation, the angle rotator read-only memory (ROM) table and arithmetic logic 810 operates in the same manner. Inphase on-time rotated output XC is generated by looking up the contents of one or more memory registers, performing additions, multiplications, or other arithmetic operations, and outputting the result. The addresses of the registers accessed depends on the value of NCO phase 330. NCO phase 330 represents the estimated offset in phase between the signal generated by local RF oscillator 308 and the carrier frequency component of the message received. The values contained at these addresses include $\cos(\theta)$ and $\sin(\theta)$, where $\theta$ is the NCO phase 330.

Subsequent arithmetic operations yield the output, which is equal to XC=XI cos(θ)−XQ sin(θ). Inphase on-time rotated output XC is then processed by one-symbol summer 812-1, resulting in correlated inphase on-time output RC1. Similarly, quadrature on-time rotated output XS is generated by looking up and outputting the contents of a memory register whose address depends on the values of XI, XQ, and NCO phase 330 (θ). The value contained at this address is equal to XS=XQ cos(θ)+XI sin(θ). Quadrature on-time rotated output XS is then processed by one-symbol summer 812-2, resulting in correlated quadrature on-time output RS1.

Similarly, inphase early-late rotated output YC is generated by looking up and outputting the contents of a memory register whose address depends on the values of YI, YQ, and NCO phase. The value contained at this address is equal to YC=YI cos(θ)-YQ sin(θ). Inphase early-late rotated output YC is then processed by one-symbol summer 812-3, resulting in correlated inphase early-late output DC1. Similarly, quadrature early-late rotated output YS is generated by looking up and outputting the contents of a memory register whose address depends on the values of YI, YQ, and NCO phase. The value contained at this address is equal to YS=YQ cos(θ)+YI sin(θ). Quadrature early-late rotated output YS is then processed by one-symbol summer 812-4, resulting in correlated quadrature early-late output DS1.

Figure 9:
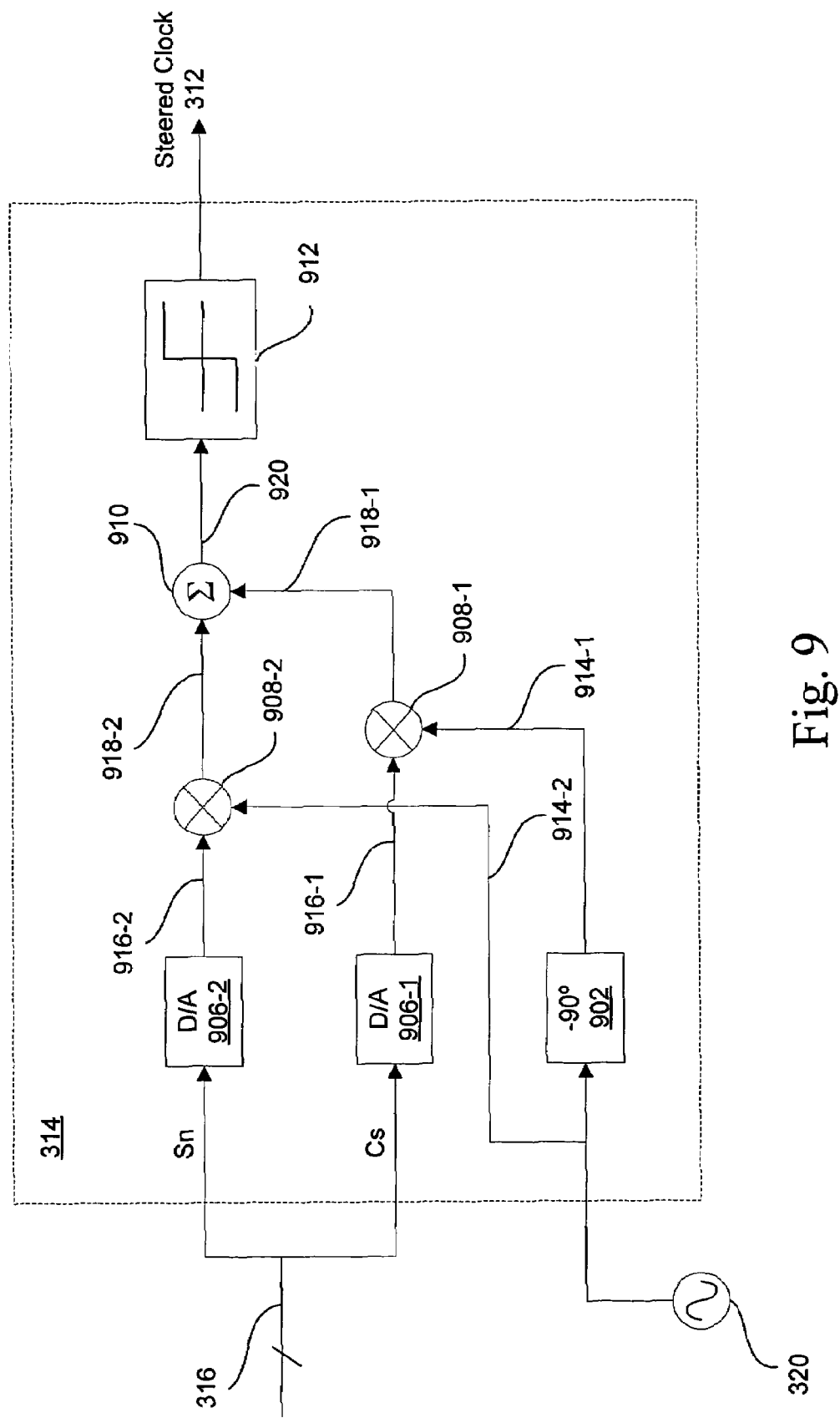
FIG. 9 is a block diagram of the synthesizer of one of the devices. The synthesizer generates a steered clock signal that is approximately synchronized with the local clock of one of the other plurality of devices in the positioning system.

The generation of steered clock signal 312 (FIG. 3) is described. Referring to FIG. 9, synthesizer 314 includes phase-shifter 902, digital-to-analog converters 906, analog multipliers 908, analog summer 910 and limiter 912. A sinusoidal signal, having a frequency corresponding to the digital sampling rate of the system, is generated by local oscillator 320. Phase-shifter 902 produces a delayed version 914-1 of the sinusoidal signal, 90° out of phase with the original signal. Synthesizer 314 receives steering values (Sn, Cs) 316 from clock steering circuit 318. Digital-to-analog (D/A) converter 906-1 converts digital steering value Cs to an analog value 916-1. Multiplier 908-1 multiplies analog value 916-1 with delayed sinusoidal signal 914-1, generating weighted delayed sinusoid 918-1. Similarly, digital-to-analog (D/A) converter 906-2 converts digital steering value Sn to an analog value 916-2. Multiplier 908-2 multiplies analog value 916-2 with sinusoidal signal 914-2, generating weighted sinusoid 918-2. Summer 910 adds the weighted sinusoid 918-2 and weighted delayed sinusoid 918-2, generating steered sinusoid 920. Finally, limiter 912 processes steered sinusoid so as to generate steered clock 312, which is a square-wave signal.

Figure 10:
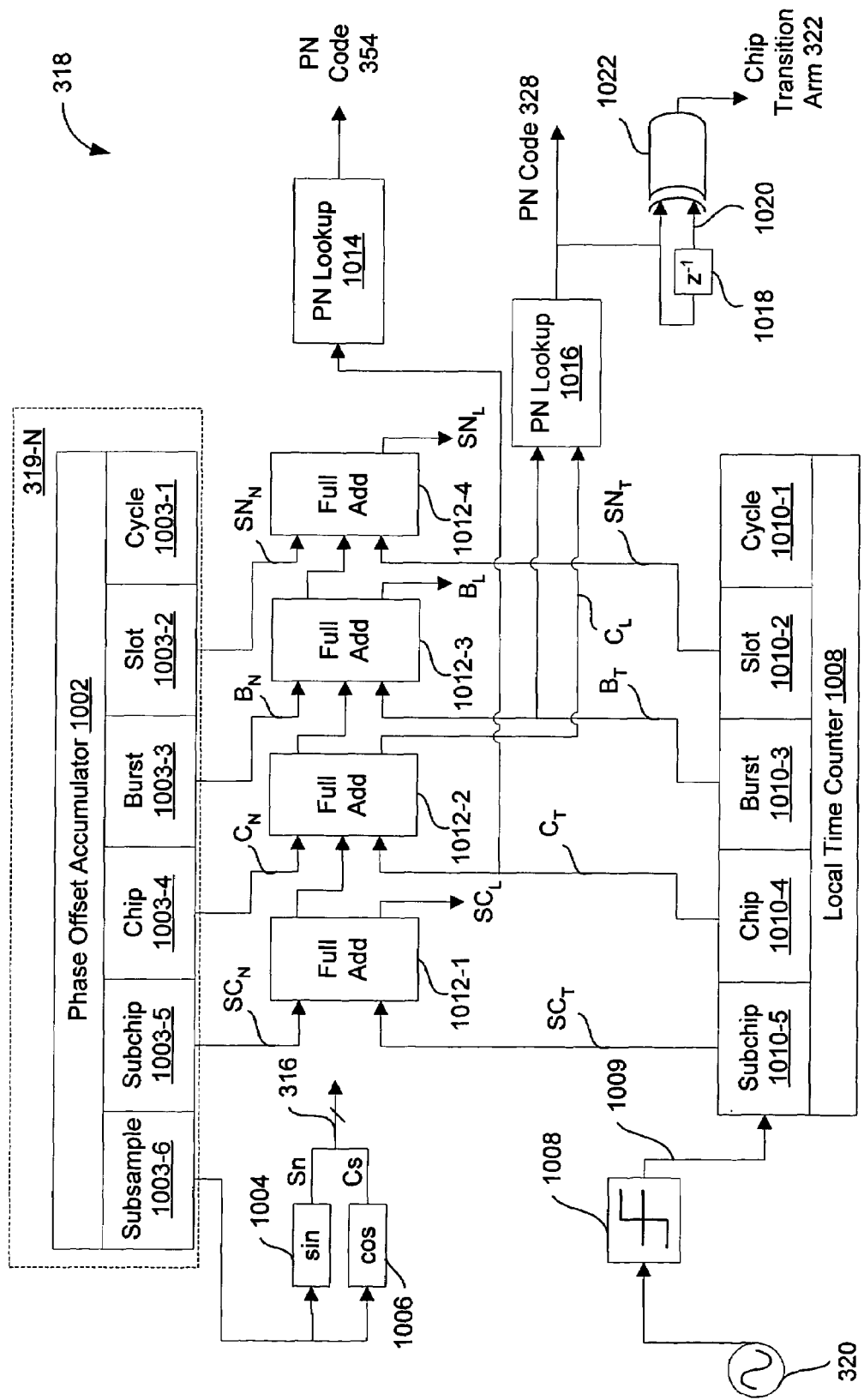
FIG. 10 is a block diagram of part of the clock-steering logic of one of the devices in the positioning system, including a register for storing an adjustment value.

In FIG. 10, the details of clock steering circuit 318 are illustrated. Clock steering circuit 318 includes a number of channel modules 319. In a preferred embodiment, the number of channel modules 319 is seven, the number of devices other than 300 in the system. In other embodiments, there may be more or fewer channel modules 319 to accommodate different numbers of devices in a positioning system. Each channel module 319 includes a phase-offset accumulator 1002, which is further partitioned into a number of registers 1003. Registers 1003 store a value representing a difference in the local time value of the device and a respective other device in the system. Register 1003-1 contains information representing a number of TDM cycles. Similarly, registers 1003-2, 1003-3, and 1003-4 contain information representing an integral number of TDM slots, bursts, and chips, respectively. Subchip register 1003-5 contains information representing an integral number of digital sampling periods. Subsample register 1003-6 contains information representing an integral number of a fixed time period, the time period being smaller that the digital sampling period of the device.

In a preferred embodiment, the information in register 1003-1 is the number of the current cycle modulo 100, the number of cycles per frame. By representing the current cycle number as an integer modulo 100, the number of bits required to represent this number is minimized. Similarly, in a preferred embodiment the information in slot register 1003-2 is the number of slots modulo eight, the number of bursts per TDM slot. Similar considerations are applied in a preferred embodiment to minimize the number of bits required to represent the information in registers 1003-3 and 1003-4. In a preferred embodiment, the digital sampling rate of the system is 100 MHz, and there are 10 samples per chip. Thus, in this embodiment, register 1003-5 contains information representing a number of chips modulo 10, the number of samples per chip. Furthermore, in this embodiment, subsample register 1003-6 contains information representing an integral number of periods of time equal to 10 ns.

Taken together, the information in registers 1003 represents a time difference between the local time value of the device and the local time value of one of the other devices. The device's local time value is stored in local time counter 1008. Local time counter 1008 is an upcounter, incrementing itself at a rate defined by system clock 1009. System clock 1009 is generated by taking the signal from local oscillator 320 and processing it with limiter 1008 to produce a square wave. Additionally, local time counter 1008 is partitioned into a number of registers. Subchip register 1010-5 contains information representing a multiple of a fixed time period. The fixed time period is equal to the period of local oscillator 320, and is the same fixed time period employed by phase offset accumulator 1002. For each cycle of system clock 1009, local time reference 1008 increases the value in subchip register 1010-5 by one, until the value is equal to the number of fixed time periods in one chip. When the value in subchip register 1010-5 value is equal to the number of fixed time periods in one chip, the value in subchip register 1010-5 is set to zero and the value in the chip register 1010-4 increased by one. When the value in chip register 1010-4 equals the number of chips per burst, the value is set to zero and the value in burst register 1010-3 increased by one. Similarly, when the value in burst register 1010-3 equals the number of bursts per TDM slot, the value is set to zero and the value in slot register 1010-2 increased by one. When the value in slot register 1010-2 equals the number of TDM slots per frame, the value is set to zero and the value in cycle register 1010-1 increased by one. When the value in cycle register 1010-1, which represents an integral number of TDM cycles, equals the number of cycles in a message frame, the value is set to zero. Taken together, the contents of registers 1010 represent the local time value relative to the TDM message frame, as estimated by the current device 300.

The contents $C_T$ of chip register 1010-4 are used by PN lookup table 1014 to generate PN code 354. PN lookup table 1014 outputs the contents of a register, the address of which is computed based on the number of the current chip in the current burst, as provided by $C_T$. In a preferred embodiment PN lookup table 1014 generates a sequence of chips representing one of two length-11 Barker sequences, depending on whether device 300 is a master or slave device.

The contents of local time reference 1008, representing an local time value and the contents of phase offset accumulator 1002, representing a difference between the local time value and the local time value of another device in the system, are added together to generate a estimate of the local time value of the respective other device. To this end, full adder 1012-1 adds value $SC_N$ from subchip register 1003-5 and value $SC_T$ from subchip register 1010-5, generating adjusted estimate of subchip $SC_L$. The carry from this addition is provided to full adder 1012-2, which adds value CN from chip register 1003-4 and value CT from chip register 1010-4, generating adjusted estimate of chip $C_L$. The carry from this addition is provided to full adder 1012-3, which adds value $B_N$ from burst register 1003-3 and value BT from burst register 1010-3, generating adjusted estimate of burst $B_L$. The carry from this addition is provided to full adder 1012-4, which adds value $SN_N$ from slot register 1003-2 and value $SN_T$ from slot register 1010-2, generating adjusted estimate of slot number $SN_L$.

The values $C_L$ and $B_L$ represent the best estimates of the chip and burst number in the received RF signal, respectively. They are used to generate a number of signals needed for reception and demodulation of the RF signal. PN lookup table 1016 generates PN code 328 by outputting the contents of a register whose address depends on both $C_L$ and BL. In a preferred embodiment, the PN lookup table 1016 generates a sequence of chips representing one of two length-11 Barker sequences, depending on whether the transmitting device corresponding to the current burst is a master or a slave. PN code 328 is then delayed by one chip by delay 1018. The delayed version 1020 of the PN code and PN code 328 are compared by exclusive-or gate 1022 to generate chip transition arm 322. Only when the current chip and the previous chip, as represented by the delayed version, are different, is chip transition arm 322 asserted. Finally, the contents of subsample register 1003-6 of the phase offset accumulator 1002 are processed by digital-to-analog lookup tables 1004 and 1006 to generate digital steering values Sn and Cs, respectively.

Figure 11:
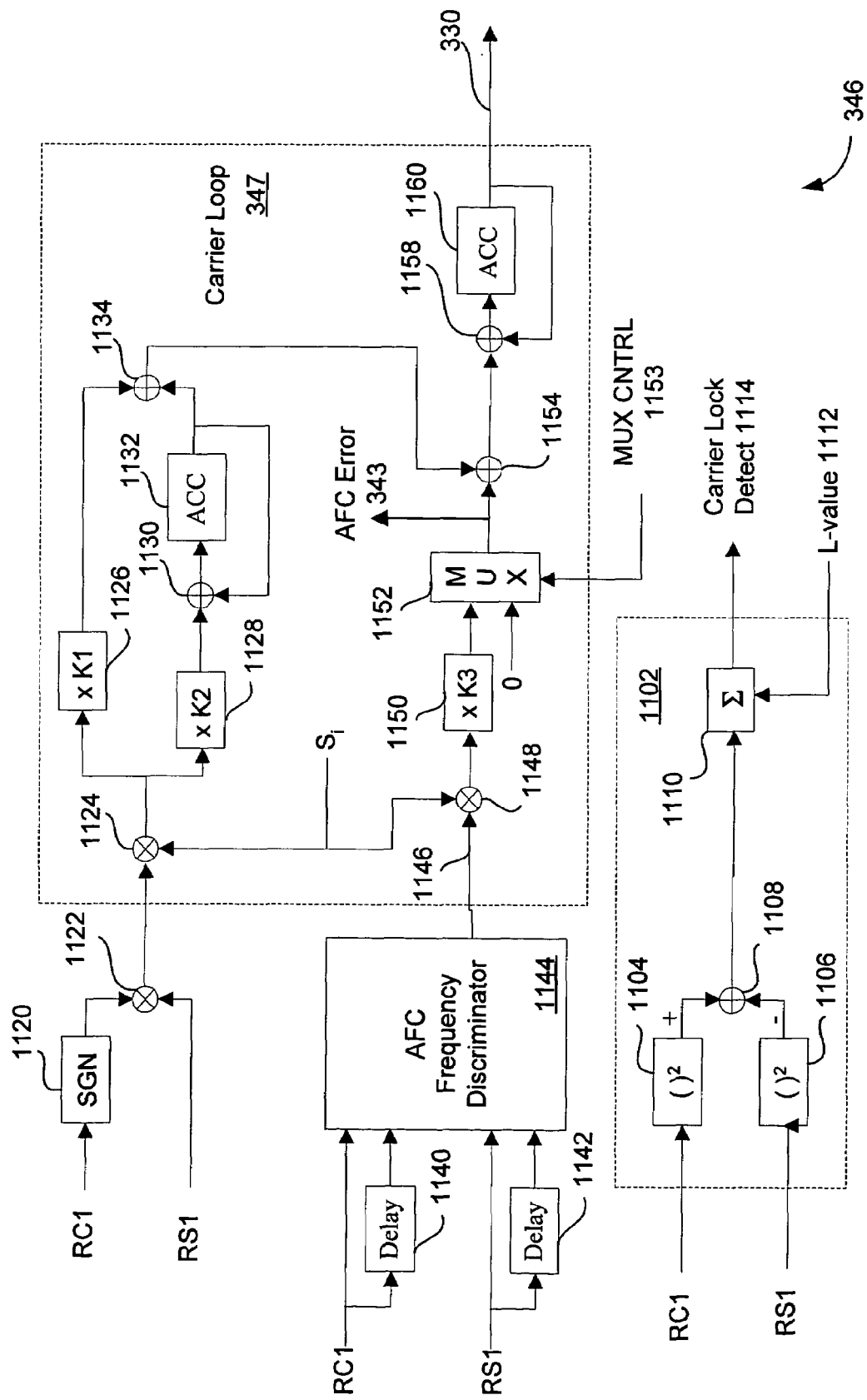
FIG. 11 is a block diagram of the PLL and filter of one of the devices in the positioning system.

Referring to FIG. 11, the detailed operation of carrier loop 346 is illustrated. Correlated inphase on-time output RC1 and correlated quadrature on-time output RS1 are provided by correlate an angle rotator 326 (FIG. 3) as part of despread signals 332. Lock detection submodule 1102 includes square-law amplifiers 1104 and 1106, summer 1108 and digital integrator 1112. Square law amplifier 1104 processes RC1, producing a unipolar binary output data stream. Similarly, square law amplifier 1106 processes RS1, and the resulting unipolar binary output stream is subtracted from that produced by square law amplifier 1104 by summer 1108. The result of this subtraction is then summed by digital integrator 1110, producing carrier lock detect signal 1114. Digital integrator 1110 utilizes L-value 1112 from microprocessor 338 to determine how many symbols in the input data stream to sum over. Use of large L-values (corresponding to two or more symbols) smoothes the value of carrier lock detect 1114 over time. As a consequence, a low value of carrier lock detect 1114 can correctly be interpreted as indicating a loss of carrier phase lock by carrier loop 346.

To compensate for frequency as well as phase differences between the local RF oscillator 308 and the carrier component of the received message, some embodiments include automatic frequency control (AFC) circuitry. Referring to FIG. 11, correlated inphase on-time output RC1 is delayed by one symbol by delay 1140, and both signals are provided to AFC frequency discriminator 1144. Similarly, correlated quadrature on-time output RS1 is delayed by one symbol by delay 1142, and both signals are provided to AFC frequency discriminator 1144. AFC Frequency discriminator 1144 produces error signal 1146 proportional to the quantity RC1(RS1-RS1D)-RS1(RC1-RC1D), where RC1D and RS1D refer to the delayed versions of RC1 and RS1, respectively. The quantities (RS1-RS1D) and (RC1-RC1D) are proportional in magnitude to the rate of change, within a chip, of the signals RC1 and RS1, respectively. When the frequency of the local oscillator differs from that of the received RF signal, RC1 and RS1 are not constant within a given chip, and the quantities (RS1-RS1D) and (RC1-RC1D) are nonzero, generating a nonzero error signal 1146. Error signal 1146 is gated by multiplier 1148 with channel select signal S1 and amplified by amplifier 1150 having gain K3. Multiplexer 1152 serves to enable two modes of operation—one in which the error signal 1146 is utilized in the estimation of the phase and one in which it is not. MUX control signal 1153, provided by the microprocessor, selects between the output of amplifier 1150 and the constant value zero. The result is AFC error signal 343, passed in some embodiments to PLL and filter block 340 (FIG. 3). In some embodiments, microprocessor 338 sets MUX control 153 to select the constant value 0 input only when carrier lock detect signal 1114 is asserted. In other embodiments, other criteria for selecting the value of MUX control 1153 could be used.

The primary functionality that the carrier loop 347 provides is to reliable estimation of θ, the phase difference between local RF oscillator 308 and the carrier component of the received message. In some embodiments, a second-order Costas loop is used for this purpose. Correlated inphase on-time output RC1 is processed by signum block 1120. The output of signum block 1120 is one of two values opposite in polarity, depending on the polarity of RC1. Mixer 1122 multiplies the output of signum block 1120 with correlated quadrature output RS1. When the phase difference between the local RF oscillator and the carrier of the message is small, RS1≈sin(θ).

The output of mixer 1122 is then gated by channel select signal S1 via mixer 1124. The output of mixer 1124 is then passed through the first-order section of a Costas loop, being multiplied by gain K1 in digital multiplier 1126. The output of mixer 1124 is also processed in a second-order section of a Costas loop. The output of mixer 1124 is multiplied by gain K2 in digital multiplier 1128 and the result passed to summer 1130. Summer 1130 also receives as input the current value of accumulator 1132. Accumulator 1132 receives as input the output of summer 1130, completing a closed-loop. The output of accumulator 1132 is, by virtue of the closed-loop, a low pass filtered version of the output of digital multiplier 1128. The output of accumulator 1132 and of digital multiplier 1126 are summed together by summer 1134 and the result is summed with AFC error 343 by summer 1154.

The output of summer 1154 is fed into summer 1158 together with the output of accumulator 1160. Accumulator 1160 takes as its input the output of summer 1158. The closed-loop so formed serves as another low-pass filter, removing transient errors from NCO phase 330. Recall that NCO phase 330 is used by correlate and angle rotate circuit 326.

Figure 12:
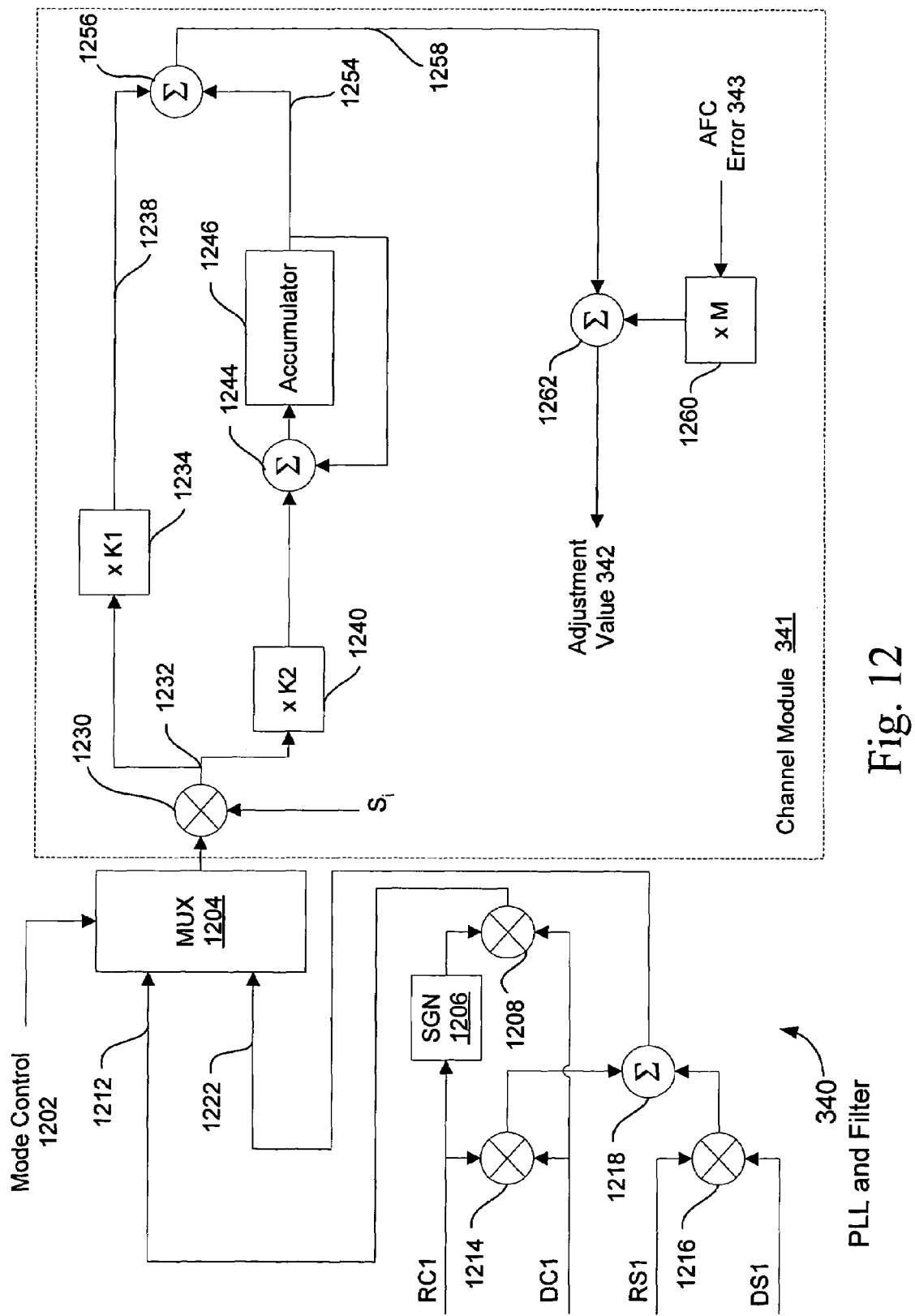
FIG. 12 is a block diagram of the carrier loop of one of the devices in the positioning system.

Referring to FIG. 12, PLL and filter 340 includes a number of channel modules 341, each containing a phase-locked loop (PLL), for estimating a time difference between an edge in the steered clock signal and an edge in the message received from one of the other devices. In some embodiments, the number of channel modules is greater than or equal to the number of devices in the positioning system, so that each PLL can remain locked to a respective one of the other devices in the system. In other embodiments, a single PLL may be used.

PLL and filter 340 is operable in both TRK and ACQ modes. The mode of operation is determined by mode control signal 1202, received from the microprocessor, that determines which of two inputs 1212 and 1222 are passed by multiplexer 1204 to channel module 341.

In ACQ mode, carrier phase lock is not assumed, so both inphase (RC1, DC1) and quadrature (RS1, DS1) correlated signals are used to determine the input to channel module 341. RC1 is mixed with DC1 by multiplier 1214, and the result input to summer 1218. Were there no time difference between an edge in the steered clock signal and an edge in the message from the other one of the plurality of devices, the output of multiplier 1214 would be very near zero in value. Similarly, RS1 and DS1 are mixed by multiplier 1216, and the result input to summer 1281. By mixing both the inphase and quadrature signals, the effect of the lack of carrier phase lock is mitigated, allowing an input to channel module 341 to be generated even in the case where RC1≈0 and DC1≈0. Finally, in ACQ mode, the summed result of the mixing is taken from the output of summer 1218 and input to multiplexer 1204, where it is passed to channel module 341 in ACQ mode.

In TRK mode, on the other hand, carrier phase lock is assumed. Thus, only the inphase signals RC1 and DC1 are used. Correlated inphase on-time signal RC1 is processed by signum block 1206. The output of signum block is one of two values opposite in polarity, depending on the polarity of RC1. Mixer 1208 multiplies the output of signum block 1208 with early-late correlated signal DC1. The resulting signal 1212 is input to multiplexer 1204, where it is passed to channel module 341 in TRK mode.

In both modes of operation, channel module 341 incorporates a phase-locked loop. The input to the phase-locked loop is only allowed to assume non-zero values during a time slot when a message is being received from a respective other device in the system. During such a time slot module select signal $S_i$ is asserted, allowing the output of multiplexer 1204 to pass through multiplier 1230. The gated input to the phase-locked loop is amplified by a gain K1 of digital multiplier 1234. The gated input to the phase-locked loop is similarly amplified by a gain of K2 by digital multiplier 1240. The output of digital multiplier 1240 is fed into summer 1244 together with the output of accumulator 1246. Accumulator 1246 takes as its input the output of summer 1244. The closed-loop so formed serves as a low-pass filter smoothing fast variations in output 1254. Higher values of K2, relative to K1, correspond to slower, less noisy tracking dynamics. Conversely, relatively higher values of K1 (relative to K2) correspond to faster, but potentially less stable and more noisy, tracking dynamics of the loop.

The result 1238 of the first order loop and the result 1254 of the second-order loop are summed by summer 1256, resulting in preliminary adjustment value 1258. Finally, AFC error 343 (from carrier loop 346, FIG. 3) is multiplied by a factor of M in amplifier 1260 and summed together with preliminary adjustment value 1258 by summer 1262. The resulting adjustment value 342 represents the difference between an edge in the steered clock 312 (FIG. 3) of the device and an edge in the message received from the respective other device.

Figure 13:
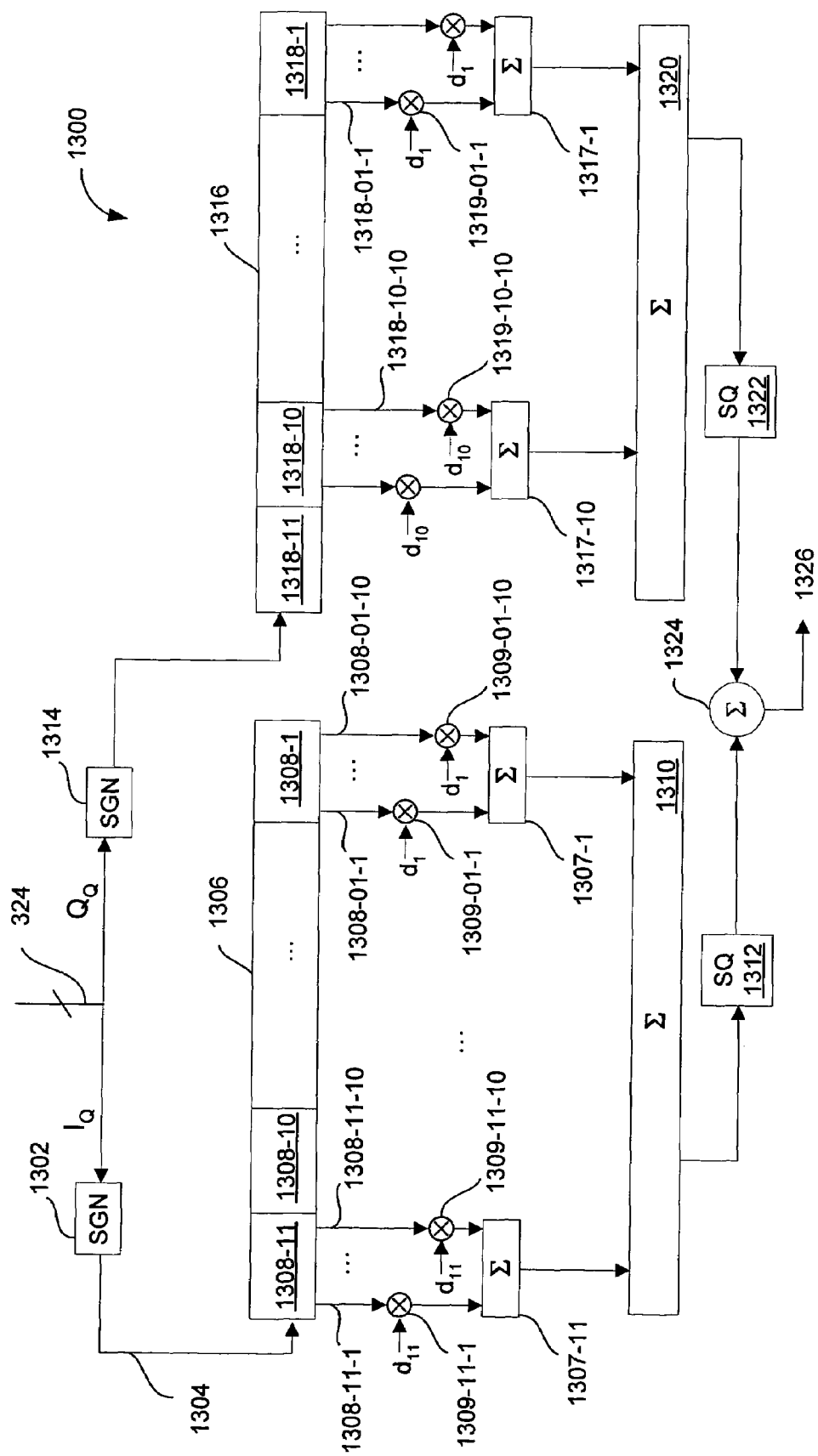
FIG. 13 is a block diagram of a matched filter in one of the devices in the positioning system.
Figure 14:
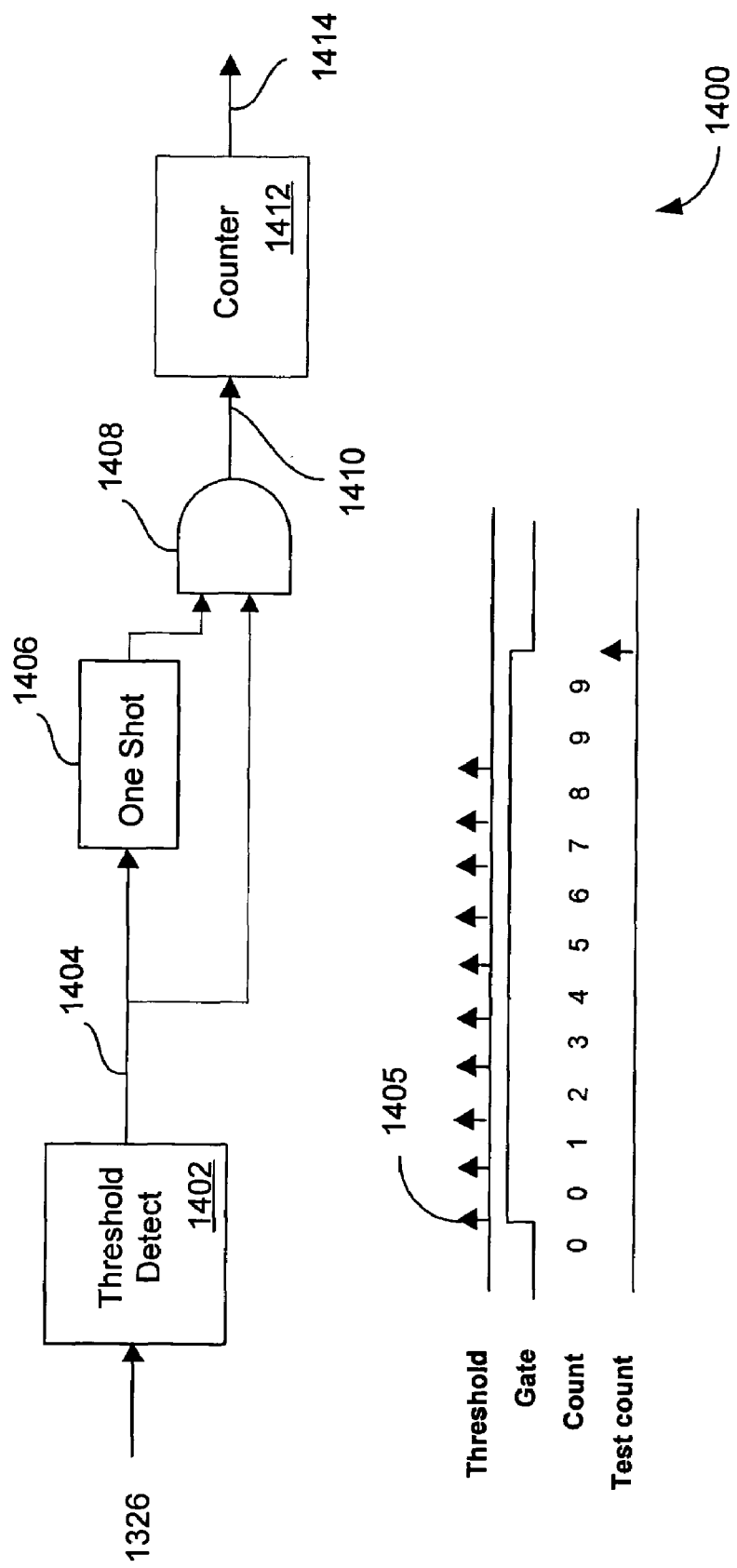
FIG. 14 is a block diagram of a burst alignment circuit in one the devices for determining the relative position of an information bit in a TDM burst.

The preceding discussion has assumed that all of the devices in the positioning system are able to determine a number of timing parameters, enabling the demodulation of information bits and transmission during appropriate slots in the TDM frame. To decode the stream of chips received, the one-symbol summers 812 (FIG. 8) of the correlate and angle rotate block must be able to determine which chip is the first of the eleven chips in a single information symbol. To enable this determination, matched filter 1300, as depicted in FIG. 13, receives digital signals 324 from windowed integrate and dump circuit 310 (FIG. 3).

To detect the presence of an information bit in the inphase sampled data stream $I_Q$, matched filter 1300 first passes $I_Q$ through signum block 1302. Signum block 1302 outputs a logic high (+1) signal for all input signals greater than zero in magnitude and outputs a logic low signal (−1) for all analog input signals less than or equal to zero in magnitude. Thus, signum block 1302 produces an output chip stream 1304 that is, in essence, a quantized version of inphase sampled chip stream $I_Q$, assuming only values of logic high or low. Inphase sampled chip stream $I_Q$ has a magnitude that is proportional to $\cos(\theta) - \sin(\theta)$, where $\theta$ represents the phase angle with which the carrier of the received message leads the local RF oscillator signal. Output chip stream 1304 has magnitude levels that are independent of this phase difference.

Next, chip stream 1304 is input to shift register 1306. Chip stream 1304 actually contains sub-chip pulses. In a preferred embodiment, these are at the cub-chip rate of ten times the chip rate. Shift register 1306 comprises a number of chip registers 1308. In general, it is necessary that the number of chip registers 1308 be equal to the length of the PN spreading code employed. Each chip register 1308 further comprises one or more sub-chip registers (not shown). In a preferred embodiment, each chip register 1308 comprises ten sub-chip registers. At a rate equal to the sub-chip sampling rate (in preferred embodiment, one-tenth the chip rate), sub-chips in each sub-chip register are shifted from left to right. For example, the first sub-chip register in sub-chip register 1308-11, once per sub-chip, discards its previous contents and stores the most recent sub-chip from chip stream 1304. The ten sub-chips in each symbol register 1308 are output once per sub-chip and sub-chip-wise multiplied with part of the length-11 Barker code of the master device. For example, chip register 1308-11 outputs the most recent ten sub-chips 1308-11-1, . . . 1308-11-10 from stream 1304. The value $d_{11}$ of the last chip in the length-11 Barker sequence is multiplied by multipliers 1309-11-1, . . . , 1309-11-10 with each output sub-chip. The result of these ten multiplications is then summed by summer 1307-11 and input to summer block 1310. Similarly, chip register 1308-11 outputs the ten sub-chips 1308-01-1, . . . 1308-01-10 stored in register 1308-11. The value $d_1$ of the first chip in the length-1 Barker sequence is multiplied by multipliers 1309-09-1, . . . , 1309-09-10 with each output sub-chip. The result of these ten multiplications is then summed by summer 1307-11 and input to summer block 1310.

The aggregate effect of the sub-chip multiplications and additions is, when the ten sub-chips in each register 1308 correspond to a single chip, that the stream 1304 is chip-wise multiplied chip-wise with the length-11 Barker code $d_1$ . . . $d_{11}$, and the result summed by summer 1310. The output of summer 1310 is the correlation of the Barker code and the most recent 11 chips, and, due to the properties of the PN Barker code, will only have a value substantially different from zero if the 11 chips in the register represent a complete information symbol. The output of summer 1310 is then processed by square law block 1312 to ensure that its value is positive, and the result input to summer 1324.

The processing of quadrature sampled data stream $Q_Q$ proceeds in an analogous manner to that of (inphase) sampled data stream $I_Q$, includes:

Quantizing the chips via signum block 1314;
Storing chips in shift register 1316;
Correlating, via multipliers and summer 1320, the stored chips with the Barker code of the master device; and Squaring the resulting signal via square-law block 1322 and providing the result to summer 1324.

Finally, summer 1324 sums the squared outputs of the $I_Q$ and $Q_Q$ processing, resulting in symbol presence detection signal 1326. The processing of quadrature sampled data stream $Q_Q$ also involves sub-chip registers (not shown), sub-chip multipliers 1319, and sub-chip summers 1317.

In addition to determining which chip is the first of the eleven chips having a single information bit, it is also necessary that a device be able to determine the relative position of an symbol in a TDM burst. To accomplish this, burst alignment circuit 1400 (FIG. 14) processes symbol presence detection signal 1326. Threshold detect block 1402 monitors signal 1326, and outputs a logic high pulse 1405 in output 1404 if input signal 1326 exceeds some predetermined threshold value. The threshold value is chosen to correspond to the detection of an information symbol by matched filter 1300. One shot 1406 outputs a logic high signal for a duration slightly less than the length of a TDM slot (which is also the length of a TDM burst plus the length of the guard time) upon detection of a pulse at its input. Logical AND gate 1408 compares the output of the one shot and the current output 1404 of the threshold detect block, and asserts output 1410 if both are in logic high state. Counter 1412 increments an internally stored value after each transition of signal 1410 from logic low to logic high. When the output of the one shot 1046 makes a logic high to logic low transition, the output 1414 is examined. If the output is a number one less than the number of bits in a burst (the first bit is not counted), the first bit detected must have been the first bit in a TDM burst. If the bit that triggered one shot 1406 was not the first bit in a TDM burst, counter 1414 will have a value of two or more less than the number of bits in a TDM burst. A microprocessor can monitor the output of one shot 1406 and output 1414 of counter 1412 to determine the relative position of the most recent bit received in a TDM burst.

In addition to the position of the most recently detected bit in the current TDM burst, devices in the system must also be able to determine the position of the current TDM burst or TDM slot in the TDM frame. This is required both to prevent simultaneous broadcasting by more than one device in the system as well as to allow a receiving device to infer the sender of a transmission based on the timing of the received message. To allow all devices in the system to determine the position of the current TDM slot in the TDM frame, the master device, once per frame, transmits a special frame marker message. The use of frame markers is well known in the art of digital communications. In some embodiments, the frame marker comprises two sequential bursts. The first burst comprises ten information bits, all having the value +1. The second burst contains the unit ID of the master, which is known by all of the other devices. Together, these two bursts, twenty bits in length, are highly unlikely to be transmitted by the master as part of a normal, information-bearing message. Thus, when a device receives these two bursts, it can reset its local time (via the registers in clock steering circuit 318, FIG. 10).

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed:

1. A positioning system, comprising:
 a plurality of devices, each device including:
  a transceiver for exchanging RF signals with the other of the plurality of devices; the transceiver periodically receiving a message from each other device of the plurality of devices during time slots assigned to the other devices;
  local clock for generating a local clock signal;
  receiver logic for determining a time of arrival, relative to the local clock signal, of the message from each of the other devices;
  transmitter logic for periodically transmitting messages to the other devices during a time slot assigned to said device, each transmitted message including information representing the determined time of arrival for at least one of the other devices;
 wherein the received message from each other device includes information representing a time of arrival at the other device of a respective message transmitted by said device;
 at least one of the devices further including ranging logic for determining a respective range to each of a plurality of the other devices, said determined respective range to a respective device of the other devices being determined as function of the determined time of arrival of the message from the other device and the time of arrival information in the message from the other device.

2. The positioning system of claim 1, wherein the ranging logic is configured to determine an average time of flight of the messages sent by and received at said device with respect to a respective device of the other devices.

3. The positioning system of claim 1, wherein the ranging logic is configured to determine an average time of flight, comprising an average of a first time of flight of the message sent by a respective device of the other devices to said device and second time of flight of the message sent by said device to said respective device, and to determine a distance between said device and said respective device based on said average time of flight.

4. The positioning system of claim 1, wherein at least two devices of the plurality of devices each includes clock synchronization logic for synchronizing the local clock with a local clock in a particular device of the plurality of devices.

5. The positioning system of claim 4, wherein
 the local clock includes a counter updated at a rate controlled by a local oscillator, the counter generating a local time value; and
 the clock synchronization logic includes clock steering logic that includes a register storing an adjustment value, and an analog clock signal generator responsive to the adjustment value in the register for generating a steered clock signal that is approximately synchronized with the local clock the other one of the plurality of devices.

6. The positioning system of claim 5, wherein the receiver logic is configured to utilize the steered clock signal to determine a difference between an edge in the steered clock signal and an edge in the message from the other one of the plurality of devices.

7. The positioning system of claim 6, wherein the clock steering logic includes logic for updating the adjustment value stored in the register in accordance with the difference between an edge in the steered clock signal and the edge in the message from the other one of the plurality of devices.

8. The positioning system of claim 6, wherein the receiver logic includes at least one windowing filter for integrating a received signal during a window time frame determined relative to the steered clock signal.

9. The positioning system of claim 8, wherein the window time frame used by the windowing filter is a sequence of window time frames, of different durations, used during a sequence of time periods to integrate the received signal.

10. The positioning system of claim 9, wherein a last window time frame of the sequence of window time frames is at least 100 times smaller than a first window time frame of the sequence of window time frames.

11. The positioning system of claim 5, wherein the adjustment value used by the analog clock signal generator specifies a relative phase of the steered clock signal with a precision better than one thousandth of a clock cycle.

12. The positioning system of claim 5, wherein the clock synchronization logic includes a summer for summing the local time value and the adjustment value to generate a time value approximately synchronized with the local clock in another one of the plurality of devices.

13. A device for use in a positioning system, the device comprising:
a receiver for receiving a message signals from another device in the positioning system during a time slot assigned to the other device;
a local clock for generating a local clock signal, the local clock including a local oscillator;
receiver logic for determining a time of arrival, relative to the local clock signal, of the message from the other device;
ranging logic for determining a respective range to the other device as a function of the determined time of arrival; and
clock synchronization logic, including clock steering logic that includes a register storing an adjustment value, and an analog clock signal generator responsive to the local oscillator and the adjustment value in the register for generating a steered clock signal that is approximately synchronized with a local clock in the other device;
wherein the receiver logic is configured to utilize the steered clock signal to deterimine a difference between an edge in the steered clock signal and an edge in the message from the other device.

14. The device of claim 13, wherein the clock steering logic includes logic for updating the adjustment value stored in the register in accordance with the difference between an edge in the steered clock signal and the edge in the message from the other device.

15. The device of claim 13, wherein the receiver logic includes at least one windowing filter for integrating a received signal during a window time frame determined relative to the steered clock signal.

16. The device of claim 15, wherein the window time frame used by the windowing filter is a sequence of window time frames, of different durations, used during a sequence of time periods to integrate the received signal.

17. The device of claim 16, wherein a last window time frame of the sequence of window time frames is at least 100 times smaller than a first window time frame of the sequence of window time frames.

18. The device of claim 13, wherein the adjustment value used by the analog clock signal generator specifies a relative phase of the steered clock signal with a precision better than one thousandth of a clock cycle.

19. The device of claim 13, wherein the local clock includes a counter updated at a rate controlled by a local oscillator, the counter generating a local time value.

20. The device of claim 19, wherein the clock synchronization logic includes a summer for summing the local time value and the adjustment value to generate a time value approximately synchronized with the local clock in the other device.

21. A method of operating a positioning system having a plurality of devices, each device configured to exchange RF signals with the other of the plurality of devices, comprising the steps of:
periodically receiving, at a first device, a message from each other device of the plurality of devices during time slots assigned to the other devices, the received message from each other device including information representing a time of arrival at the other device of a respective message transmitted by the first device;
determining a time of arrival, relative to a local clock signal of a local clock of the first device, of the message from each of the other devices;
periodically transmitting messages to the other devices during a time slot assigned to the first device, each transmitted message including information representing the determined time of arrival for at least one of the other devices; and
determining a respective range from the first device to each of a plurality of the other devices, said determined respective range to a respective device of the other devices being determined as function of the determined time of arrival of the message from the other device and the time of arrival information in the message from the other device.

22. The method of claim 21, wherein determining a respective range includes determining an average time of flight of the messages sent by and received at the first device with respect to a respective device of the plurality of other devices.

23. The method of claim 21, wherein determining a respective range includes determining an average time of flight, comprising an average of a first time of flight of the message sent by a respective device of the other devices to the first device and second time of flight of the message sent by the first device to the respective device, and determining a distance between the first device and the respective device based on the average time of flight.

24. The method of claim 21, further including synchronizing the local clock of at least two of the plurality of devices with a local clock in a particular device of the plurality of devices.

25. The method of claim 24, wherein the receiving step further includes:
updating a counter belonging to the local clock at a rate controlled by a local oscillator, the counter generating a local time value;
storing an adjustment value in a register; and
generating, based on the adjustment value, a steered clock signal that is approximately synchronized with the local clock the other one of the plurality of devices.

26. The method of claim 25, wherein the receiving step further includes:
utilizing the steered clock signal to determine a difference between an edge in the steered clock signal and an edge in the message from the other one of the plurality of devices.

27. The method of claim 26, wherein the receiving step further includes:
updating the adjustment value stored in the register in accordance with the difference between an edge in the steered clock signal and the edge in the message from the other one of the plurality of devices.

28. The method of claim 27, wherein the receiving step further includes:
integrating a received signal during a window time frame determined relative to the steered clock signal.

29. The method of claim 28, wherein the received signal is integrated multiple times during a sequence of time periods, the integrating occurring during a sequence of window time frames of different durations.

30. The method of claim 29, wherein a last window time frame of the sequence of window time frames is at least 100 times smaller than a first window time frame of the sequence of window time frames.

31. The method of claim 25, wherein the adjustment value specifies a relative phase of the steered clock signal with a precision better than one thousandth of a clock cycle.

32. The method of claim 25, further including:
summing the local time value and the adjustment value to generate a time value approximately synchronized with the local clock in another one of the plurality of devices.

33. A method for operating a device in a positioning system, comprising:
receiving a message signal from another device in the positioning system during a time slot assigned to the other device;
generating a local clock signal;
determining a time of arrival, relative to the local clock signal, of the message from the other device;
determining a respective range to the other device as a function of the determined time of arrival;
storing an adjustment value in a register; and
generating, based on the adjustment value, a steered clock signal that is approximately synchronized with a local clock of the other device;
wherein the method includes determining a difference between an edge in the steered clock signal and an edge in the message from the other device.

34. The method of claim 33, further including updating the adjustment value stored in the register in accordance with the difference between an edge in the steered clock signal and the edge in the message from the other device.

35. The method of claim 34, wherein the receiving step further includes:
integrating a received signal during a window time frame determined relative to the steered clock signal.

36. The method of claim 35, wherein the received signal is integrated multiple times during a sequence of time periods, the integrating occurring during a sequence of window time frames of different durations.

37. The method of claim 36, wherein a last window time frame of the sequence of window time frames is at least 100 times smaller than a first window time frame of the sequence of window time frames.

38. The method of claim 33, wherein the adjustment value specifies a relative phase of the steered clock signal with a precision better than one thousandth of a clock cycle.

39. The method of claim 33, further including:
summing the local time value and the adjustment value to generate a time value approximately synchronized with the local clock of the other device.

* * * * *

UNITED STATES PATENT AND TRADEMARK OFFICE
CERTIFICATE OF CORRECTION

PATENT NO. : 7,286,624 B2  Page 1 of 1
APPLICATION NO. : 10/614098
DATED : October 23, 2007
INVENTOR(S) : Woo et al.

It is certified that error appears in the above-identified patent and that said Letters Patent is hereby corrected as shown below:

Column 23, line 52, please delete "deterimine" and insert --determine--.

Signed and Sealed this

Twenty-fifth Day of December, 2007

JON W. DUDAS
*Director of the United States Patent and Trademark Office*